(12) United States Patent
Satoh et al.

(10) Patent No.: US 7,860,345 B2
(45) Date of Patent: Dec. 28, 2010

(54) POSITION AND ORIENTATION MEASUREMENT METHOD AND POSITION AND ORIENTATION MEASUREMENT APPARATUS

(75) Inventors: Kiyohide Satoh, Kawasaki (JP); Shinichi Aratani, Tokyo (JP); Shinji Uchiyama, Yokohama (JP); Kenji Morita, Yokohama (JP); Rika Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 938 days.

(21) Appl. No.: 11/690,914

(22) Filed: Mar. 26, 2007

(65) Prior Publication Data
US 2007/0242899 A1 Oct. 18, 2007

(30) Foreign Application Priority Data
Mar. 31, 2006 (JP) ............................. 2006-100388

(51) Int. Cl.
*G06K 9/36* (2006.01)
*G06K 7/00* (2006.01)
*H04N 5/225* (2006.01)

(52) U.S. Cl. ................... 382/291; 382/312; 348/207.99

(58) Field of Classification Search ................. 382/103, 382/106, 107, 162, 165, 181, 190, 195, 199, 382/201, 203, 254, 255, 266, 274, 286, 291, 382/293, 312; 348/207.13, 207.99, 208.4; 345/156, 158, 162, 589, 633; 702/85, 91, 702/92, 93, 104
See application file for complete search history.

(56) References Cited

U.S. PATENT DOCUMENTS 6,792,370 B2   9/2004  Satoh et al. ................... 702/95
6,993,450 B2   1/2006  Takemoto et al. ........... 702/153
7,092,109 B2   8/2006  Satoh et al. .................. 356/620
7,130,754 B2  10/2006  Satoh et al. .................... 702/95
7,397,930 B2 * 7/2008  Uchiyama et al. ........... 382/103

(Continued)

FOREIGN PATENT DOCUMENTS

JP      2005-107247         4/2005

(Continued)

OTHER PUBLICATIONS

I. Skrypnky, et al., "Scene Modelling, Recognition and Tracking with Invariant Image Features", ISMAR 2004, pp. 110-119.

(Continued)

*Primary Examiner*—Kanji Patel
(74) *Attorney, Agent, or Firm*—Fitzpatrick, Cella, Harper & Scinto

(57) ABSTRACT

The first values of position and orientation of an image sensing device are obtained by using positions of all indices in a frame image. Indices having the same inherent information between a first index group (FIG) in the frame image and a second index group (SIG) in a preceding frame image are detected as a common index. If the information of the SIG contains information different from that of the FIG, second values of the position and orientation are obtained by using the positions of the common indices in the preceding frame image. If the information of the FIG contains information different from that of the SIG, third values of the position and orientation are obtained by using the positions of the common indices in the frame image. The first values are corrected by using correction values based on the obtained first to third values.

12 Claims, 12 Drawing Sheets

U.S. PATENT DOCUMENTS

| | | |
|---|---|---|
| 2005/0069174 A1 | 3/2005 | Uchiyama et al. ........... 382/103 |
| 2005/0256396 A1 | 11/2005 | Takemoto ................... 600/414 |
| 2007/0092161 A1 | 4/2007 | Aratani et al. .............. 382/286 |

OTHER PUBLICATIONS

J. Park, et al., "Vision-based Pose Computation: Robust and Accurate Augmented Reality Tracking", IWAR 1999, pp. 3-12.

K. Satoh, et al., "UG+B: A Registration Framework Using User's View, Gyroscope, and Bird's-Eye View", Transaction of the Virtual Reality Society of Japan, vol. 10, No. 3, pp. 391-400 (2005), and English Abstract.

U.S. Appl. No. 11/611,404, filed Dec. 15, 2006, Rika Takemoto, et al.

* cited by examiner

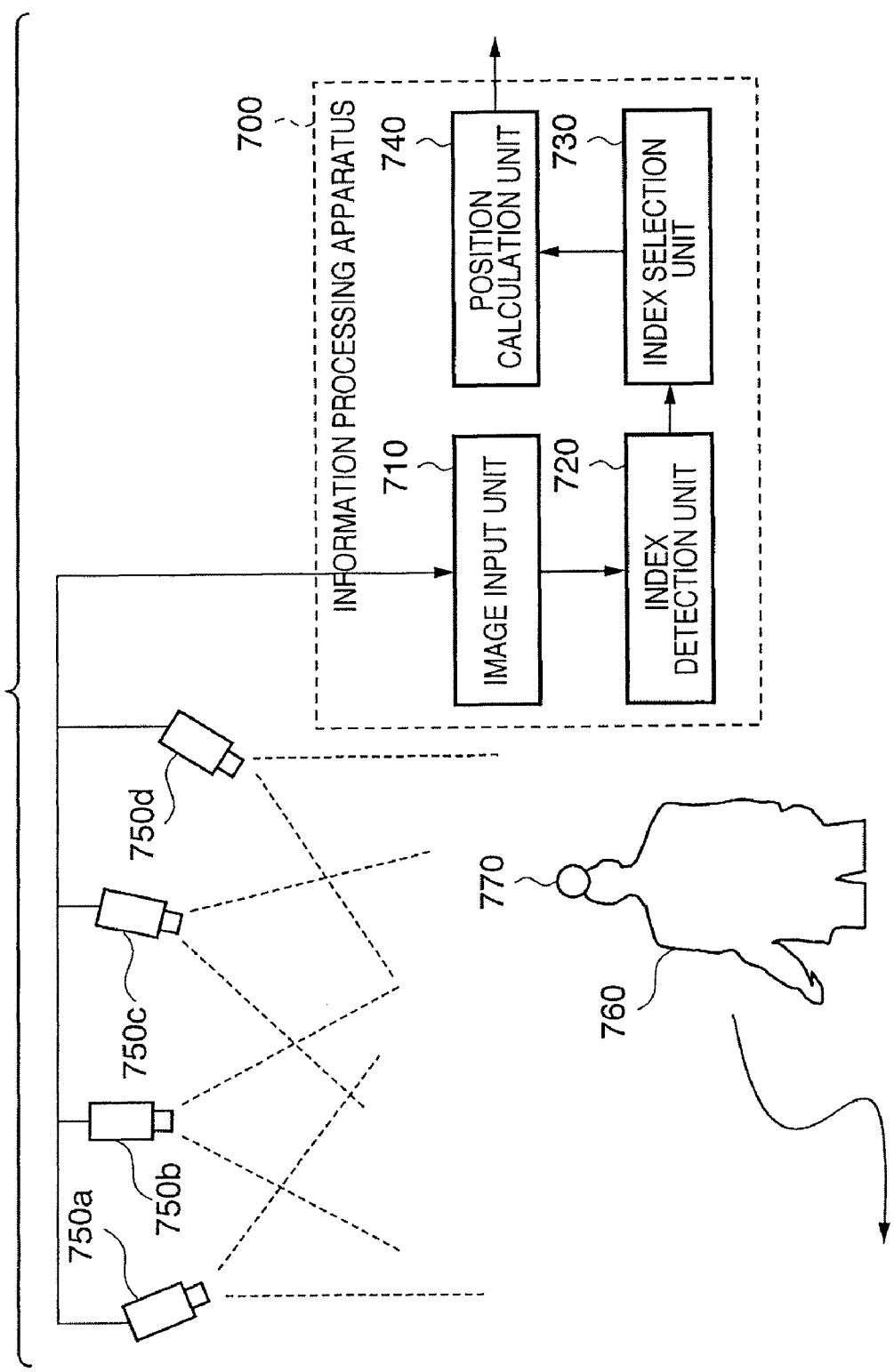

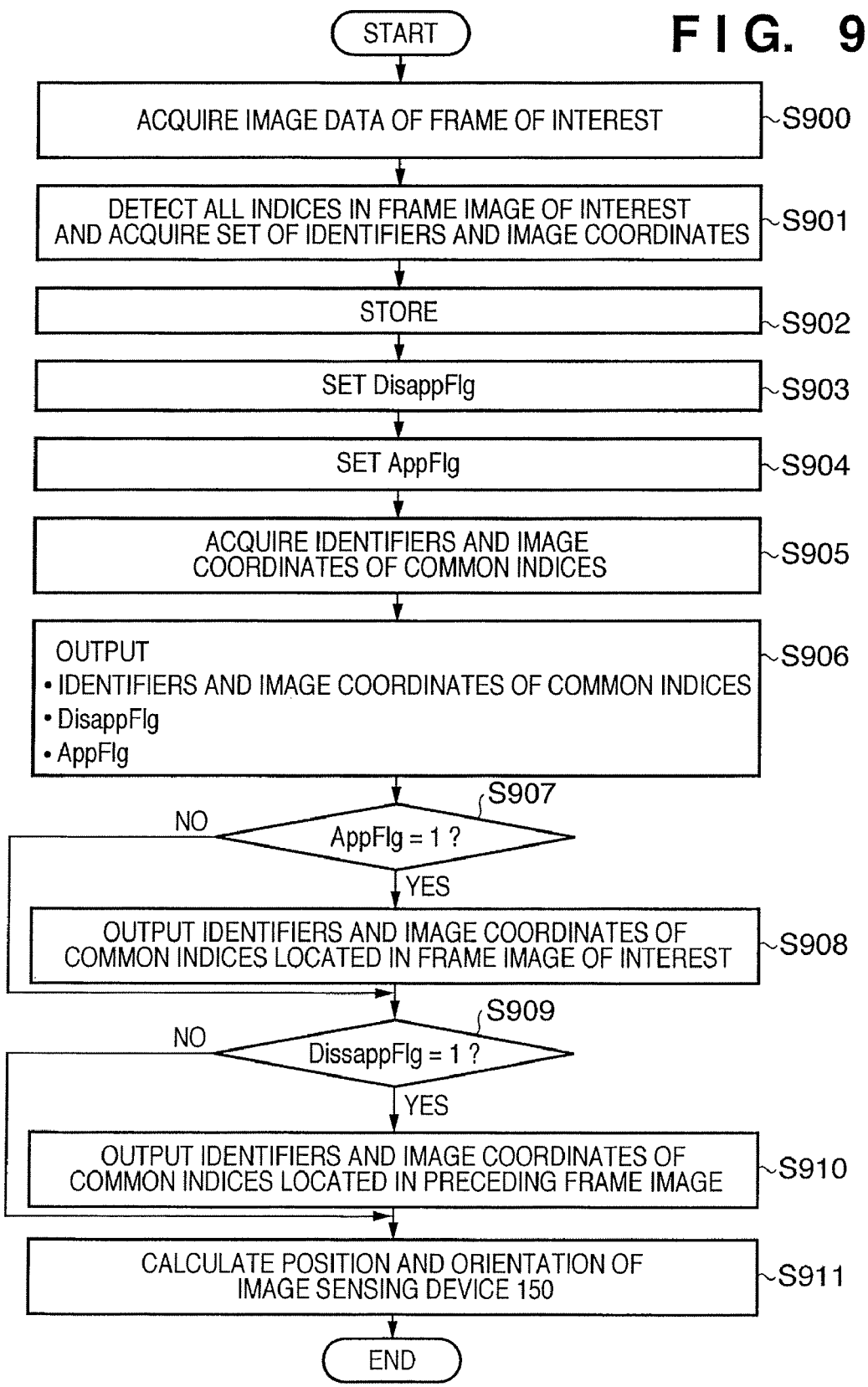

POSITION AND ORIENTATION MEASUREMENT METHOD AND POSITION AND ORIENTATION MEASUREMENT APPARATUS

BACKGROUND OF THE INVENTION

1. Field of the Invention

The present invention relates to a technique of obtaining the position and orientation of an image sensing device.

2. Description of the Related Art

A lot of research has been done in association with mixed reality that presents a text or CG image superimposed on physical space. An image display device to present the mixed reality superimposes an image generated based on the position and orientation of a camera on an image captured by, e.g., a video camera and displays the superimposed image.

To implement such an image display device, it is necessary to measure the relative position and orientation between a camera coordinate system and a reference coordinate system defined in physical space. An example will be considered here, in which a virtual object is superimposed at a predetermined position, i.e., in a room or on a table in the physical environment. In this case, the reference coordinate system is defined at an appropriate point (e.g., the floor surface of the room or the table surface) of the environment, and the position and orientation of the camera in the reference coordinate system are obtained.

To implement this measurement, it is common practice to estimate the position and orientation of a camera by using an image captured by it (Sato, Uchiyama, and Yamamoto, "UG+B method: A Registration method using a subjective viewpoint camera, an objective viewpoint camera, and an orientation sensor", Transaction of The Virtual Reality Society of Japan, Vol. 10, No. 3, pp. 391-400, 2005, I. Skrypnyk and D. Lowe, "Scene modeling, recognition and tracking with invariant image features", Proc. 3rd International Symposium on Mixed and Augmented Reality (ISMAR'04), pp. 110-119, 2004, and J. Park, B. Jiang, and U. Neumann, "Vision-based pose computation: robust and accurate augmented reality tracking", Proc. 2nd International Workshop on Augmented Reality (IWAR'99), pp. 3-12, 1999). The position and orientation of a camera in the reference coordinate system can be measured by, e.g., the following method.

(1) A plurality of indices with known positions (reference coordinates) in the reference coordinate system are arranged or set on a floor, wall, or table surface in a room. The indices may be artificial markers intentionally provided for measurement or natural features that exist inherently in the environment.

(2) The coordinates of the projected images of the indices in an image captured by a camera are detected.

(3) The position and orientation of the camera are obtained based on the correspondence between the detected image coordinates of the indices and their reference coordinates.

(Prior Art 1)

A typical method of implementing the above-described step (3) is a nonlinear optimization method which minimizes the reprojection error of an index by iterative calculation (Sato, Uchiyama, and Yamamoto, "UG+B method: A Registration method using a subjective viewpoint camera, an objective viewpoint camera, and an orientation sensor", Transaction of The Virtual Reality Society of Japan, Vol. 10, No. 3, pp. 391-400, 2005). This method calculates the mathematical values of the image coordinates (theoretical coordinates) of indices based on the estimated values of the position and orientation of a camera and the reference coordinates of the indices. The estimated values of the position and orientation of the camera are corrected to make the theoretical coordinates as close as possible to the actually detected coordinates of the indices. Optimum position and orientation are calculated by repeatedly calculating the theoretical coordinates and correcting the estimated values. To obtain the position and orientation of a camera with respect to time series images captured continuously, the above-described optimization process is executed for each input frame. The optimum position and orientation in each frame are thus calculated.

(Prior Art 2)

There are also provided methods of implementing the above-described step (3) in consideration of the continuity between frames in time series images. In a method, for example, a constraint "to inhibit any large change from the position and orientation in a preceding frame" is applied to the above-described nonlinear optimization method, thereby minimizing error while maintaining the continuity between frames as much as possible (I. Skrypnyk and D. Lowe, "Scene modeling, recognition and tracking with invariant image features", Proc. 3rd International Symposium on Mixed and Augmented Reality (ISMAR'04), pp. 110-119, 2004).

(Prior Art 3)

It is also common practice to continuously obtain the position and orientation of a camera by using an extended Kalman filter (J. Park, B. Jiang, and U. Neumann, "Vision-based pose computation: robust and accurate augmented reality tracking", Proc. 2nd International Workshop on Augmented Reality (IWAR'99), pp. 3-12, 1999). In the method using an extended Kalman filter, a motion model of a camera is generated by using an assumption such as a uniform velocity/uniform angular velocity motion or a uniform acceleration/uniform angular acceleration motion. The camera position, orientation, velocity, acceleration, angular velocity, and the like are set as the constituent elements of the state variables of the extended Kalman filter. In addition, sets of image coordinates and reference coordinates of indices in each frame are input as observed values. In the method using the extended Kalman filter, the position and orientation output in a frame are influenced not only by the observed values of the frame but also by the past state based on the assumed motion model. If the actual motion of the camera does not largely change from the assumed motion model, the estimated values of the position and orientation vary while maintaining the consistency between frames. Hence, a smooth motion can be obtained on the time series.

(Prior Art 4)

The position and orientation of a camera are directly measured by a position and orientation sensor attached to the camera, and errors are corrected by using captured indices. To avoid discontinuity that occurs when different correction values are obtained between frames, Japanese Patent Laid-Open No. 2005-107247 discloses a technique of averaging correction values obtained in a plurality of frames and applying the averaged correction value.

The approach (Prior Art 1) for calculating a position and orientation to minimize the reprojection error of an index in each frame still has room for improvement in terms of consistency between frames. Particularly if the combination of captured indices changes between frames, positions and orientations output from two consecutive frames may be discontinuous. This is because the position and orientation obtained in each frame contain error whose behavior changes if the combination of input indices changes.

The optimization method (Prior Art 2) considering the continuity between frames may be unable to follow an abrupt movement of a camera because of the inertial forces for the positions and orientations obtained in the past. Even in the method using an extended Kalman filter (Prior Art 3), it may be difficult to follow an abrupt change in the velocity or acceleration of a camera, or overshoot may occur. This is because the actual motion of the camera largely changes from an assumed motion model. In an interval with such a situation, the position and orientation measurement accuracy lowers.

Prior Art 4 aims at "correcting" the measurement error of a position and orientation sensor and cannot be applied to position and orientation measurement using only indices.

SUMMARY OF THE INVENTION

The present invention has been made in consideration of the above-described problems, and provides a technique of measuring the position and orientation of a measurement target object by using a captured image while ensuring both the consistency between frames and following to movement.

In order to achieve an object of the present invention, for example, a position and orientation measurement method of the present invention comprises the following arrangement.

That is, a position and orientation measurement method comprising:

an image input step of inputting an image from an image sensing device;

an index detection step of detecting indices sensed in the image and acquiring information about image coordinates of the indices;

a position and orientation calculation step of calculating a position and orientation of the image sensing device by using information about image coordinates of current indices detected from a current frame in the index detection step;

a correction value calculation step of determining index appearance and/or disappearance between the current indices and past indices used to calculate the position and orientation of the image sensing device in a past frame and calculating position and orientation correction values to relax discontinuity in position and orientation estimated values between frames caused by the index appearance and/or disappearance; and a position and orientation correction step of correcting the position and orientation calculated in the position and orientation calculation step by using the correction values calculated in the correction value calculation step.

In order to achieve an object of the present invention, for example, a position and orientation measurement method of the present invention comprises the following arrangement.

That is, a position and orientation measurement method comprising:

an image input step of inputting an image from an image sensing device;

an index detection step of detecting indices sensed in the image and acquiring information about image coordinates of the indices;

an index selection step of comparing current indices detected from a current frame in the index detection step with past indices used to calculate the position and orientation of the image sensing device in a past frame and selecting common indices commonly included in both the current indices and the past indices;

a first position and orientation calculation step of calculating a first position and orientation of the image sensing device by using the information about the image coordinates of the current indices;

a second position and orientation calculation step of calculating a second position and orientation of the image sensing device by using information about image coordinates of only indices selected as the common indices from the current indices; and a position and orientation integration step of calculating the position and orientation of the image sensing device in the current frame by using the first position and orientation and the second position and orientation.

In order to achieve an object of the present invention, for example, a position and orientation measurement method of the present invention comprises the following arrangement.

That is, a position and orientation measurement method comprising:

an image input step of inputting an image from an image sensing device;

an index detection step of detecting indices sensed in the image and acquiring information about image coordinates of the indices;

an index selection step of comparing current indices detected from a current frame in the index detection step with past indices used to calculate the position and orientation of the image sensing device in a past frame and selecting common indices commonly included in both the current indices and the past indices;

a first position and orientation calculation step of calculating a first position and orientation of the image sensing device by using the information about the image coordinates of the current indices;

a second position and orientation calculation step of calculating a second position and orientation of the image sensing device by using information about image coordinates of only indices selected as the common indices from the past indices; and a position and orientation integration step of calculating the position and orientation of the image sensing device in the current frame by using the first position and orientation and the second position and orientation.

In order to achieve an object of the present invention, for example, a position and orientation measurement method of the present invention comprises the following arrangement.

That is, a position and orientation measurement method comprising:

an image input step of inputting an image from an image sensing device;

an index detection step of detecting indices sensed in the image and acquiring information about image coordinates of the indices;

an index selection step of comparing current indices detected from a current frame in the index detection step with past indices used to calculate the position and orientation of the image sensing device in a past frame and selecting common indices commonly included in both the current indices and the past indices;

a first position and orientation calculation step of calculating a first position and orientation of the image sensing device by using the information about the image coordinates of the current indices;

a second position and orientation calculation step of calculating a second position and orientation of the image sensing device by using information about image coordinates of only indices selected as the common indices from the current indices;

a third position and orientation calculation step of calculating a third position and orientation of the image sensing device by using information about image coordinates of only indices selected as the common indices from the past indices; and a position and orientation integration step of calculating the position and orientation of the image sensing device in the current frame by using the first position and orientation, the second position and orientation, and the third position and orientation.

In order to achieve an object of the present invention, for example, a position and orientation measurement method of the present invention comprises the following arrangement.

That is, a position and orientation measurement method comprising:

an image input step of inputting an image from at least one image sensing device that senses a measurement target;

an index detection step of detecting indices existing on the measurement target from the image and acquiring information about image coordinates of the indices;

a position and orientation calculation step of calculating a position or a position and orientation of the measurement target by using information about image coordinates of current indices detected from a current frame in the index detection step;

a correction value calculation step of determining index appearance and/or disappearance between the current indices and past indices used to calculate the position or the position and orientation of the measurement target in a past frame and calculating a position correction value or position and orientation correction values to relax discontinuity in a portion estimated value or position and orientation estimated values between frames caused by the index appearance and/or disappearance; and a position and orientation correction step of correcting the position or the position and orientation calculated in the position and orientation calculation step by using the correction values calculated in the correction value calculation step.

In order to achieve an object of the present invention, for example, a position and orientation measurement apparatus of the present invention comprises the following arrangement.

That is, a position and orientation measurement apparatus comprising:

image input unit adapted to input an image from an image sensing device;

index detection unit adapted to detect indices sensed in the image and acquire information about image coordinates of the indices;

position and orientation calculation unit adapted to calculate a position and orientation of the image sensing device by using information about image coordinates of current indices detected from a current frame by the index detection unit;

correction value calculation unit adapted to determine index appearance and/or disappearance between the current indices and past indices used to calculate the position and orientation of the image sensing device in a past frame and calculate position and orientation correction values to relax discontinuity in position and orientation estimated values between frames caused by the index appearance and/or disappearance; and position and orientation correction unit adapted to correct the position and orientation calculated by the position and orientation calculation unit by using the correction values calculated by the correction value calculation unit.

In order to achieve an object of the present invention, for example, a position and orientation measurement apparatus of the present invention comprises the following arrangement.

That is, a position and orientation measurement apparatus comprising:

at least one image sensing device adapted to sense a measurement target;

image input unit adapted to input an image from the image sensing device;

index detection unit adapted to detect indices existing on the measurement target from the image and acquire information about image coordinates of the indices;

position and orientation calculation unit adapted to calculate a position or a position and orientation of the measurement target by using information about image coordinates of current indices detected from a current frame by the index detection unit;

correction value calculation unit adapted to determine index appearance and/or disappearance between the current indices and past indices used to calculate the position or the position and orientation of the measurement target in a past frame and calculate a position correction value or position and orientation correction values to relax discontinuity in a portion estimated value or position and orientation estimated values between frames caused by the index appearance and/or disappearance; and position and orientation correction unit adapted to correct the position or the position and orientation calculated by the position and orientation calculation unit by using the correction values calculated by the correction value calculation unit.

Further features of the present invention will become apparent from the following description of exemplary embodiments with reference to the attached drawings.

BRIEF DESCRIPTION OF THE DRAWINGS

FIG. 7 is a block diagram showing the functional arrangement of a system for measuring the position of a measurement target object by using a plurality of image sensing devices according to the second embodiment of the present invention;

FIG. 9 is a flowchart of a process executed by an information processing apparatus 100 to obtain the position and orientation of an image sensing device 150 in a frame of interest.

DESCRIPTION OF THE EMBODIMENTS

The preferred embodiments of the present invention will be described below in detail with reference to the accompanying drawings.

First Embodiment

Figure 1:
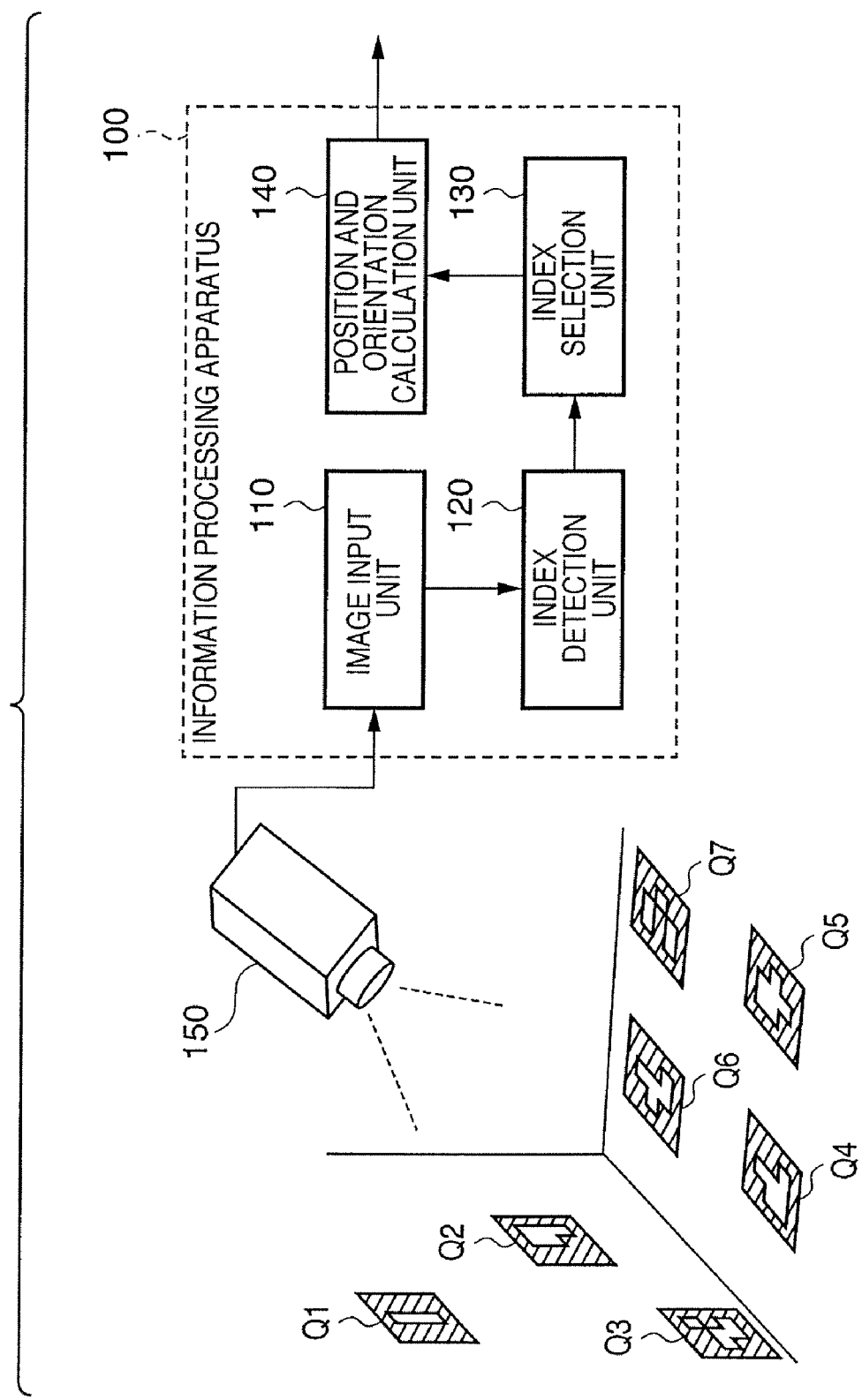
FIG. 1 is a block diagram showing the functional arrangement of a system for measuring the position and orientation of an image sensing device according to the first embodiment of the present invention.

In this embodiment, the position and orientation of an image sensing device are measured by using a moving image of a physical space sensed by the image sensing device. FIG. 1 is a block diagram showing the functional arrangement of a system for measuring the position and orientation of an image sensing device according to this embodiment. As shown in FIG. 1, the system according to this embodiment includes an image sensing device 150 and an information processing apparatus 100. The information processing apparatus 100 comprises an image input unit 110, index detection unit 120, index selection unit 130, and position and orientation calculation unit 140.

The environment (physical space) where the system of this embodiment is installed will be described. As shown in FIG. 1, a reference coordinate system which has an origin at a predetermined point and three axes, i.e., x-, y-, and z-axes that cross each other perpendicularly at the origin is defined in the physical space. A plurality of indices Qk (k=1, 2, ..., K) with known positions in the reference coordinate system are arranged in the physical space. In this case, k indicates an identifier unique to each index, and K indicates the total number of arranged indices. The indices Qk may be, e.g., markers having the same shape and different colors. Alternatively, the indices Qk may be feature points such as natural features with different texture features. Rectangular indices each formed from a certain rectangular area are also usable.

That is, any indices can be used if the identifier of each index on a sensed image of the physical space including the indices is discriminable, and the index coordinate positions on the image are detectable.

Indices which are set intentionally may be used, or indices which are not set intentionally and have natural shapes may be used. Indices with different properties may be mixed. In FIG. 1, seven rectangular indices Q1 to Q7 are arranged.

The units included in the system of this embodiment will be described next.

The image sensing device 150 is a camera capable of sensing a moving image of the physical space, and for example, a digital video camera. A camera coordinate system which has an origin at a predetermined point (e.g., lens focal point), a -z-axis in the direction of the line of sight, and two axes, i.e., x- and y-axes that cross each other and also the z-axis perpendicularly is defined in the image sensing device 150. The information processing apparatus 100 measures the position and orientation of the camera coordinate system relative to the reference coordinate system as the position and orientation of the image sensing device 150.

Each frame image (physical space image) sensed by the image sensing device 150 is input to the image input unit 110 of the information processing apparatus 100 as an image signal. The image input unit 110 converts each received frame image signal into digital data and outputs it to the index detection unit 120 of the succeeding stage. That is, the image input unit 110 supplies the image data of each frame to the index detection unit 120.

The index detection unit 120 detects all indices located in each frame image received from the image input unit 110. More specifically, the index detection unit 120 identifies indices (indices Q) located in each image and specifies the identifiers of the indices. The index detection unit 120 also detects the image coordinates of the indices located in each image. The index detection unit 120 outputs the identifiers and image coordinates of each detected index to the index selection unit 130.

The indices are detected by a method corresponding to the type of indices in use. For example, if the indices are formed from markers with different colors, an area corresponding to each marker color is detected from the image. The barycenter of each area is detected as the coordinates of the index. If the indices are formed from feature points with different texture features, the position of each index is detected by template matching using a template image. In this case, the template image of each index is held in advance as known information.

If rectangular indices are used, binarization and labeling are performed for the image, and a label area defined by four straight lines is detected as an index candidate. Detection errors are eliminated by determining whether the rectangular area of each index candidate includes a specific pattern. In addition, the identifier of each index is acquired based on the pattern in the rectangular area. The coordinates of the four vertices of the rectangular area are output as the index position.

In either case, there are conventionally various methods of specifying the identifier and image coordinates of each index in an image, and any method is usable. The detected indices are assigned serial numbers n (n=1, ..., N), and the identifier of each index detected on an image is represented by kn. N indicates the total number of indices detected on an image.

Figure 3:
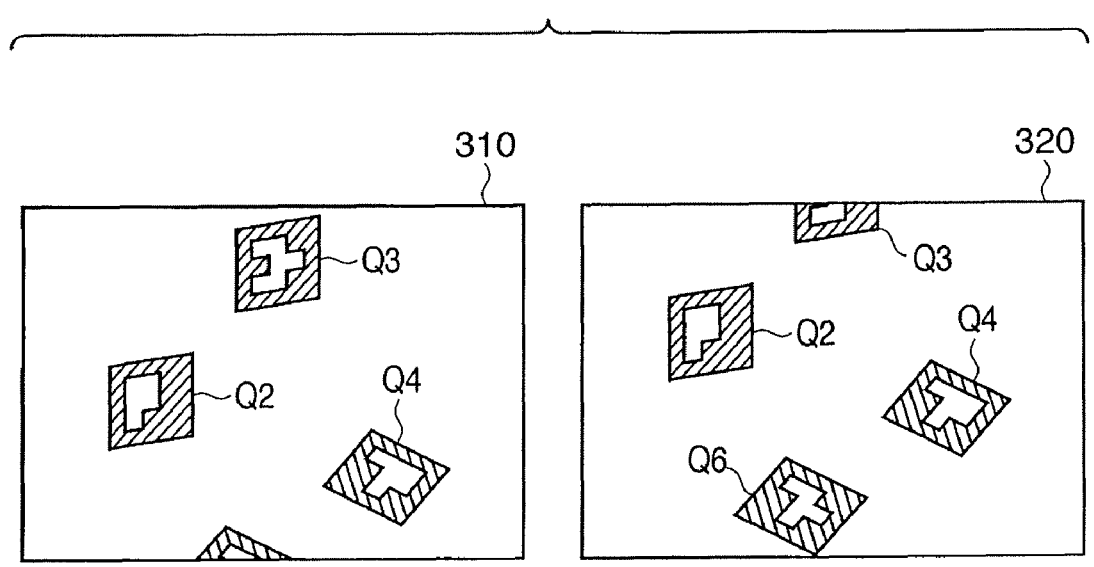
FIG. 3 is a view showing an example of two consecutive frame images sensed by an image sensing device 150.

FIG. 3 is a view showing an example of two consecutive frame images sensed by the image sensing device 150. An image 310 is regarded as the ith frame image, and an image 320 is regarded as the (i+1)th frame image. Indices Q2, Q3, and Q4 are located on the image 310, whereas indices Q2, Q4, and Q6 are located on the image 320. Assume that the image 320 is input to the index detection unit 120. In this case, the index detection unit 120 outputs the identifiers (k1=2, k2=4, k3=6) of the detected indices and their image coordinates (the coordinates of four points of each rectangular index) on the image 320.

Referring back to FIG. 1, the index selection unit 130 receives the identifiers and image coordinates of the detected indices from the index detection unit 120, monitors disappearance/appearance of indices between frames, selects information necessary for calculating the position and orientation of the image sensing device 150, and outputs the information to the position and orientation calculation unit 140.

Figure 2:
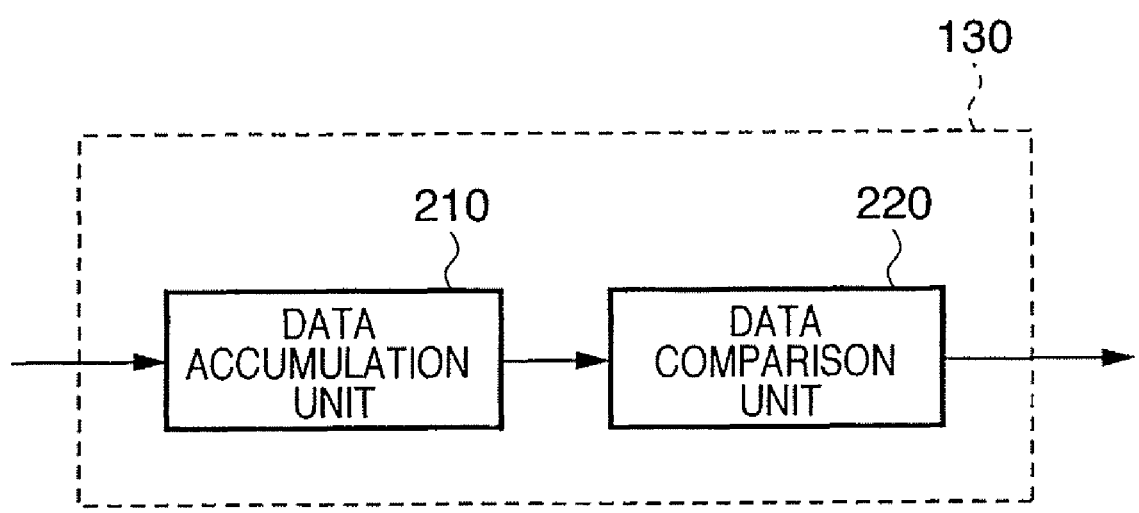
FIG. 2 is a block diagram showing the functional arrangement of an index selection unit 130.

FIG. 2 is a block diagram showing the functional arrangement of the index selection unit 130. As shown in FIG. 2, the index selection unit 130 comprises a data accumulation unit 210 and a data comparison unit 220.

Upon receiving sets of the identifiers and image coordinates of the detected indices from the index detection unit 120, the data accumulation unit 210 stores them over a plurality of frames. Hence, the data accumulation unit 210 holds a set of the identifiers and image coordinates of the indices in correspondence with each frame image.

The data comparison unit 220 reads out, from the data accumulation unit 210, the identifiers of indices located on the image of a frame of interest and the identifiers of indices located on the image of a frame before the frame of interest (e.g., a frame immediately before, which will be referred to as a preceding frame hereinafter). The data comparison unit 220 compares the identifiers and specifies, of the identifiers of indices located on the frame image of interest, an index (to be referred to as a common index hereinafter) having the same identifier as that of an identifier located on the preceding frame image. The data comparison unit 220 also specifies an index (appearing index) which exists not on the preceding frame image but on the frame image of interest, and an index (disappearing index) which exists not on the frame image of interest but on the preceding frame image.

This specifying process will be described in more detail. First, a flag DisappFlg indicating the presence/absence of a disappearing index and a flag AppFlg indicating the presence/absence of an appearing index are initialized to 0. If the identifiers of indices located on the preceding frame image include an identifier different from any of the identifiers of indices located on the frame image of interest, the data comparison unit 220 determines that an index has disappeared on the image upon switching from the preceding frame to the frame of interest and sets DisappFlg to 1. If the identifiers of indices located on the frame image of interest include an identifier different from any of the identifiers of indices located on the preceding frame image, the data comparison unit 220 determines that a new index has appeared on the image upon switching from the preceding frame to the frame of interest and sets AppFlg to 1.

The data comparison unit 220 also detects indices having identical identifiers in the frame image of interest and the preceding frame image as a common index and holds the set of the identifiers and image coordinates of the detected common indices.

Then, the data comparison unit 220 outputs the following data to the position and orientation calculation unit 140 based on the following conditions.

(1) The identifiers and image coordinates of all indices located on the frame image of interest
(2) The value of flag AppFlg (0 or 1)
(3) The value of flag DisappFlg (0 or 1)
(4) The identifiers and image coordinates of common indices located on the frame image of interest only when AppFlg=1
(5) The identifiers and image coordinates of common indices located on the preceding frame image only when DisappFlg=1

This will be described taking the images 310 and 320 shown in FIG. 3 as an example. The frame image of interest is the image 320, and the preceding frame image is the image 310. The indices Q2, Q3, and Q4 are detected on the preceding frame image, and the indices Q2, Q4, and Q6 are detected on the frame image of interest. The data comparison unit 220 compares the identifiers of indices located on the frame images. The data comparison unit 220 determines that Q3 has disappeared and Q6 has appeared on the image 320 upon switching from the preceding frame to the frame of interest and detects Q2 and Q4 as common indices. As a result, the data comparison unit 220 outputs the following information to the position and orientation calculation unit 140 as information corresponding to (1) to (5).

Figure 4:
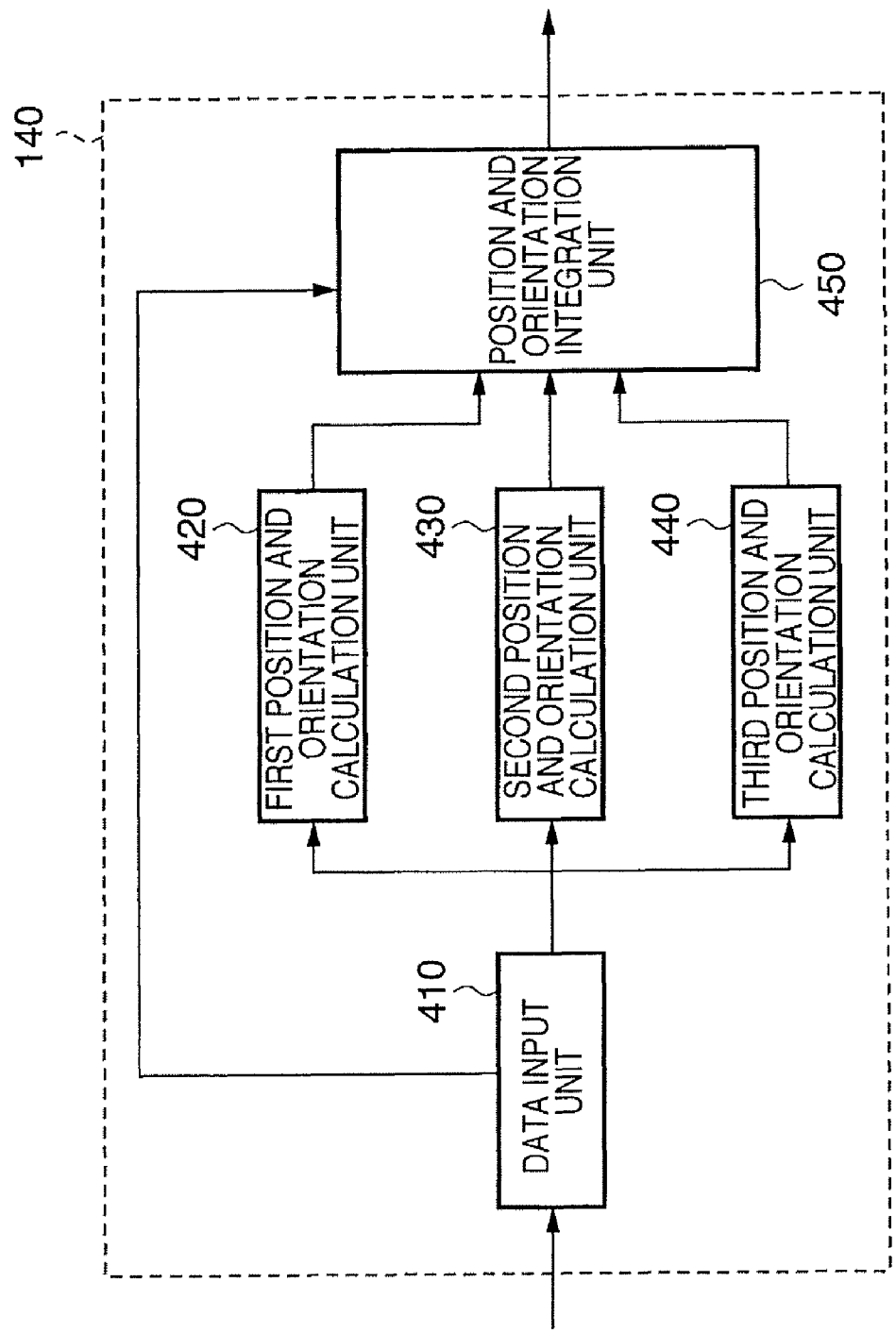
FIG. 4 is a block diagram showing the functional arrangement of a position and orientation calculation unit 140.

(1) The identifiers (2, 4, 6) and image coordinates of all indices located on the frame image of interest
(2) AppFlg=1
(3) DisappFlg=1
(4) The identifiers (2, 4) and image coordinates of the common indices located on the frame image of interest
(5) The identifiers (2, 4) and image coordinates of the common indices located on the preceding frame image The position and orientation calculation unit 140 calculates the position and orientation of the image sensing device 150 by using the image coordinates of the indices received from the data comparison unit 220. FIG. 4 is a block diagram showing the functional arrangement of the position and orientation calculation unit 140. As shown in FIG. 4, the position and orientation calculation unit 140 comprises a data input unit 410, first position and orientation calculation unit 420, second position and orientation calculation unit 430, third position and orientation calculation unit 440, and position and orientation integration unit 450.

Upon receiving the information output from the index selection unit 130, the data input unit 410 executes a process of distributing them. More specifically, the data input unit 410 outputs the set of the image coordinates and identifiers of all indices located on the frame image of interest to the first position and orientation calculation unit 420. Upon receiving AppFlg, the data input unit 410 refers to the value of AppFlg. If AppFlg=1, the data input unit 410 outputs the set of the identifiers and image coordinates of common indices located on the frame image of interest to the second position and orientation calculation unit 430. Upon receiving DisappFlg, the data input unit 410 refers to the value of DisappFlg. If DisappFlg=1, the data input unit 410 outputs the set of the identifiers and image coordinates of common indices located on the preceding frame image to the third position and orientation calculation unit 440.

Each of the first position and orientation calculation unit 420, second position and orientation calculation unit 430, and third position and orientation calculation unit 440 calculates the estimated values of the position and orientation of the image sensing device 150 by using the received identifiers and image coordinates and the positions of corresponding indices in the reference coordinate system. To calculate the position and orientation of the image sensing device 150 based on the set of the image coordinates and positions of the plurality of indices in the reference coordinate system, this embodiment employs reprojection error minimization by nonlinear optimization (non-patent reference 1). Conventionally, various methods have been proposed to calculate the position and orientation of the image sensing device 150 based on the set of the image coordinates and position of the plurality of indices in the reference coordinate system. However, the essence of the following description does not change depending on the method. In this embodiment, separate position and orientation calculation units are used for three kinds of input data. Instead, a single position and orientation calculation unit may be used time-divisionally.

The position and orientation integration unit 450 receives the positions and orientations obtained by the first position and orientation calculation unit 420, second position and orientation calculation unit 430, and third position and orientation calculation unit 440. The position and orientation integration unit 450 also receives AppFlg and DisappFlg from the data input unit 410. The position and orientation integration unit 450 calculates (decides) the position and orientation of the image sensing device 150 by using these pieces of information in consideration of the consistency with the preceding frame. The position and orientation calculation unit 140 outputs the decided position and orientation of the image sensing device 150 to the outside. The output destination is not particularly limited, and a description thereof will be omitted here because it is not the spirit of the present invention. The process of the position and orientation calculation unit 140 will be described later in detail with reference to FIGS. 6A and 6B.

Figure 5:
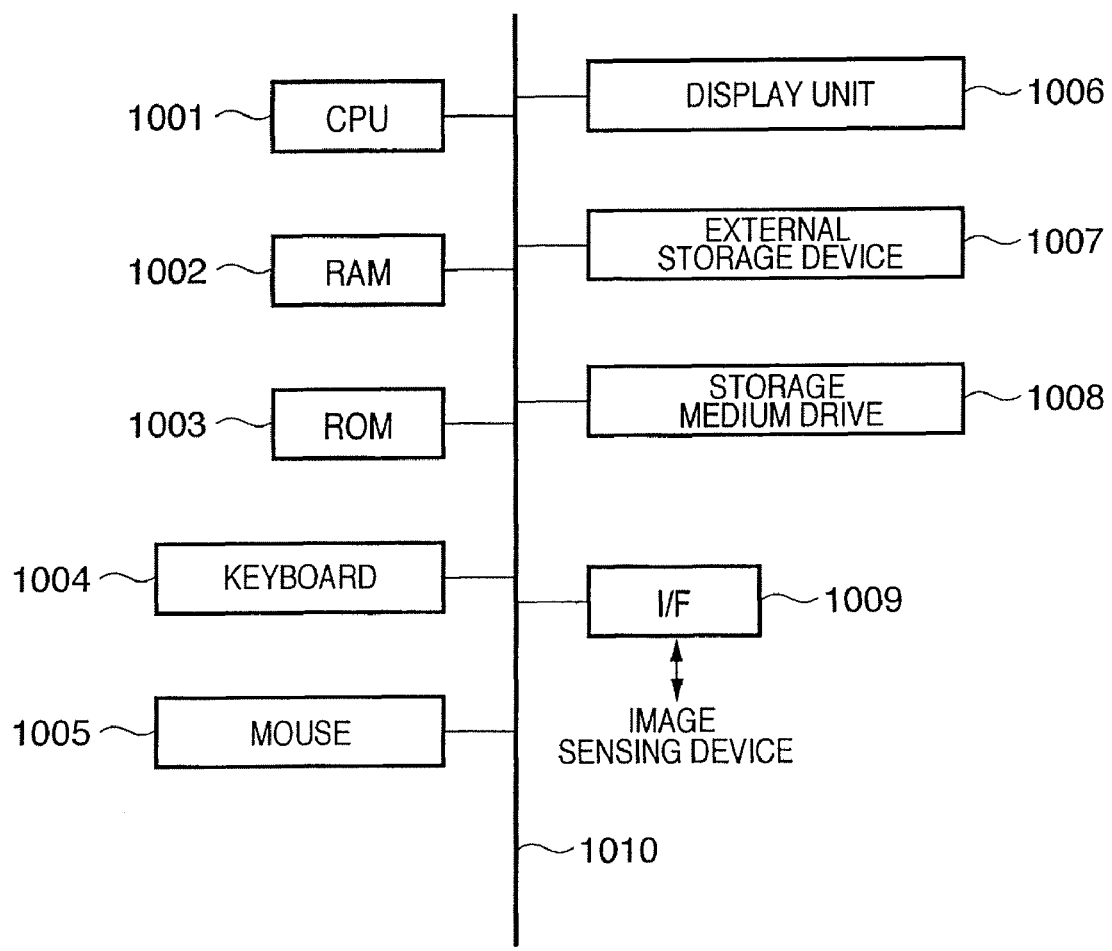
FIG. 5 is a block diagram showing the hardware configuration of a computer applicable to an information processing apparatus 100.

FIG. 5 is a block diagram showing the hardware configuration of a computer applicable to the information processing apparatus 100.

A CPU 1001 controls the overall computer by using programs and data stored in a RAM 1002 and a ROM 1003 and also functions as the image input unit 110, index detection unit 120, index selection unit 130, and position and orientation calculation unit 140. The data accumulation unit 210 of the index selection unit 130 is provided in the RAM 1002 or an external storage device 1007 (to be described later).

The RAM 1002 has an area to temporarily store programs and data loaded from the external storage device 1007 or a storage medium drive 1008 and data input from an external device (image sensing device 150) via an I/F 1009. The RAM 1002 also has a work area necessary for the CPU 1001 to execute various kinds of processes.

The ROM 1003 generally stores computer programs and setting data.

Each of a keyboard 1004 and a mouse 1005 serves as an input device. The operator of the computer can input various kinds of instructions to the CPU 1001 by operating these input devices.

A display unit 1006 including a CRT or a liquid crystal display can display a process result of the CPU 1001 as an image or a text. The display unit 1006 displays, e.g., a message to be displayed for position and orientation measurement of the image sensing device 150.

The external storage device 1007 such as a hard disk drive functions as a mass storage device. The external storage device 1007 saves the OS (Operating System) and programs and data to make the CPU 1001 execute the processes of the image input unit 110, index detection unit 120, index selection unit 130, and position and orientation calculation unit 140. The external storage device 1007 also saves the known information described above in the embodiment. For example, the external storage device 1007 holds the sets of identifiers and positions in the reference coordinate system for all indices existing in the physical space.

The programs and data saved in the external storage device 1007 are loaded into the RAM 1002 as needed under the control of the CPU 1001. When the CPU 1001 executes processes by using the programs and data loaded into the RAM 1002, the computer executes the processes described in this embodiment as those executed by the information processing apparatus 100.

The storage medium drive 1008 reads out programs and data stored in a storage medium such as a CD-ROM or a DVD-ROM in accordance with an instruction from the CPU 1001 and outputs them to the RAM 1002 or external storage device. 1007.

The I/F 1009 includes an analog video port to connect the image sensing device 150 to a bus 1010 or a digital input/output port such as IEEE1394, and an Ethernet™ port to output the calculated position and orientation data of the image sensing device 150 to the outside. The I/F 1009 implements some of the functions of the image input unit 110.

The bus 1010 connects the above-described constituent elements to each other.

FIG. 9 is a flowchart of the process executed by the information processing apparatus 100 to obtain the position and orientation of the image sensing device 150 in the frame of interest. To do the same process for each frame image sensed by the image sensing device 150, the process corresponding to the flowchart in FIG. 9 is executed for each frame.

The external storage device 1007 saves the programs and data to cause the CPU 1001 to execute the process corresponding to the flowchart in FIG. 9. The programs and data are loaded into the RAM 1002 under the control of the CPU 1001. The CPU 1001 executes the process by using them, thereby implementing the processes to be described later.

In step S900, the image input unit 110 supplies image data of the frame of interest to the index detection unit 120. In step S901, the index detection unit 120 identifies indices located in the frame image of interest and detects their identifiers and image coordinates. The index detection unit 120 outputs the identifiers and image coordinates of the detected indices to the index selection unit 130.

In step S902, the data accumulation unit 210 receives the set of the identifiers and image coordinates of the indices located on the frame image of interest from the index detection unit 120 and holds it. In step S903, the data comparison unit 220 sets the flag DisappFlg. In step S904, the data comparison unit 220 sets the flag AppFlg.

In setting the flag DisappFlg, the data comparison unit 220 reads out the identifiers of indices located on the frame image of interest and those of indices located on the preceding frame image from the data accumulation unit 210 and compares them, as described above. If an identifier different from any of the identifiers of indices located on the frame image of interest is present, the data comparison unit 220 sets DisappFlg to 1. Even in setting AppFlg, if the identifiers of indices located on the frame image of interest include an identifier different from any of the identifiers of indices located on the preceding frame image, the data comparison unit 220 sets AppFlg to 1, as described above.

In step S905, the data comparison unit 220 detects indices having identical identifiers in the frame image of interest and the preceding frame image as a common index and acquires the set of the identifiers and image coordinates of the detected common indices.

In step S906, the data comparison unit 220 outputs the identifiers and image coordinates of all indices located on the frame image of interest and the flags AppFlg and DisappFlg to the position and orientation calculation unit 140.

In step S907, the data comparison unit 220 refers to the value of AppFlg. If AppFlg=1, the process advances to step S908 to output the identifiers and image coordinates of the common indices located on the frame image of interest to the position and orientation calculation unit 140.

In step S909, the data comparison unit 220 refers to the value of DisappFlg. If DisappFlg=1, the process advances to step S910 to output the identifiers and image coordinates of the common indices located on the preceding frame image to the position and orientation calculation unit 140.

In step S911, the position and orientation calculation unit 140 obtains the position and orientation of the image sensing device 150 in the frame of interest.

Figure 6A:
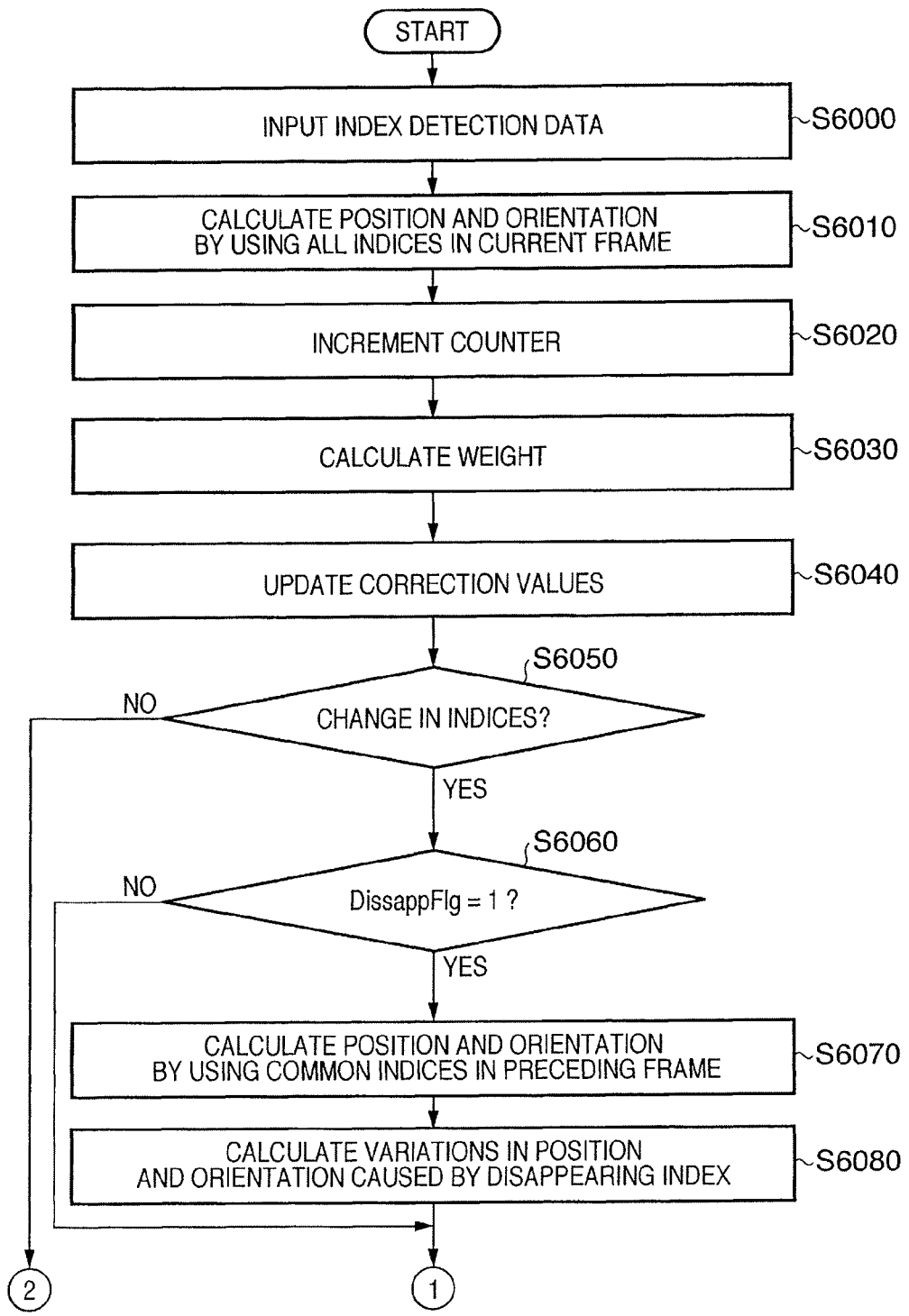
FIGS. 6A and 6B are flowcharts showing details of a process in step S911.
Figure 6B:
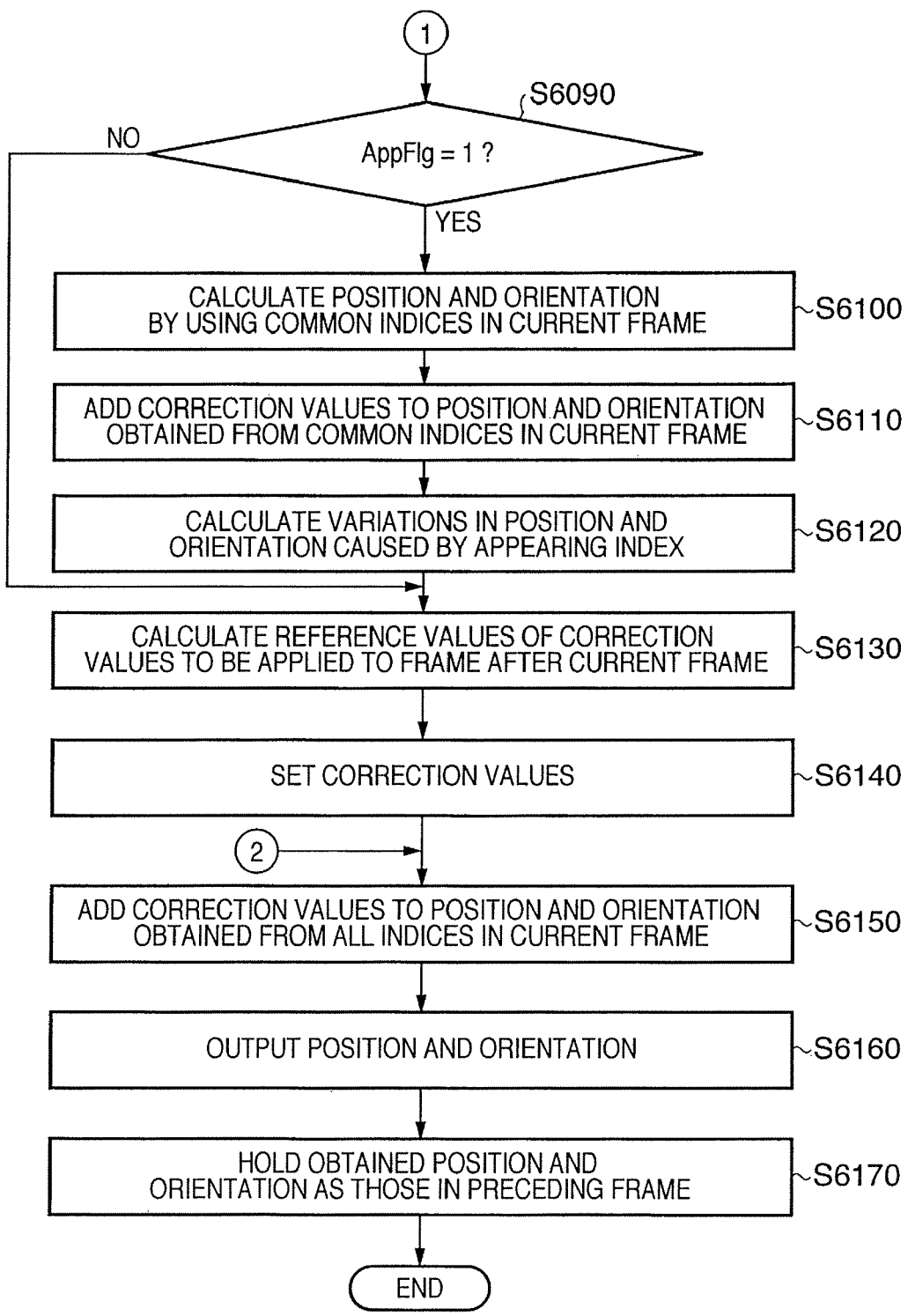

FIGS. 6A and 6B are flowcharts showing details of the process in step S911.

In the following description, the position of the image sensing device 150 is internally expressed by a ternary vector $t=[x\ y\ z]^T$. The orientation of the image sensing device 150 is internally expressed by a 3×3 rotation matrix R that executes rotation transformation from the camera coordinate system to the reference coordinate system. Orientation information is used in the form of a ternary vector $\omega=[\xi\ \psi\ \zeta]^T$ indicating the rotation axis and a rotation angle $\theta$ about the axis, as needed. $R(\omega,\theta)$ indicates a rotation matrix corresponding to the orientation represented by the rotation axis $\omega$ and rotation angle $\theta$. The conversion method between the orientation expression by the rotation matrix R and that by the rotation axis $\omega$ and rotation angle $\theta$ is known, and a description thereof will be omitted.

In step S6000, the data input unit 410 receives data (index detection data) output from the index selection unit 130. In step S6010, the first position and orientation calculation unit 420 receives the image coordinates of all indices located on the frame image of interest from the data input unit 410. The first position and orientation calculation unit 420 acquires, from the external storage device 1007, the positions of all indices located on the frame image of interest in the reference coordinate system by using the identifiers of all indices located on the frame image of interest.

The first position and orientation calculation unit 420 calculates the estimated values of the position and orientation of the image sensing device 150 by using the image coordinates of all indices received from the data input unit 410 and the positions of all indices located on the frame image of interest in the reference coordinate system. Let t1 be the calculated position estimated value, and R1 be the orientation estimated value. The position and orientation estimated values obtained in this step correspond to the output of a conventional method of estimating optimum position and orientation in each frame without considering the continuity between frames.

In step S6020, the position and orientation integration unit 450 increments a frame counter Ct (initial value=0) by one. The frame counter indicates the total number of frames following the frame with an appearing or disappearing index between frames.

In step S6030, based on the value of the frame counter Ct, the position and orientation integration unit 450 calculates a weight w to be multiplied by the reference values (to be described later) of correction values based on the value of the frame counter Ct. The weight w is given by, e.g., $$w=\{\cos(Ct/Dr\times\pi)+1\}/2 \qquad (1)$$

where Dr is the correction period. The correction period is a parameter indicating how long a process (correction process) of avoiding inconsistency caused by appearance or disappearance of an index between frames should be executed. To do the correction process for a period of, e.g., 30 frames, Dr is set to 30. Dr may be a predetermined value set in advance. The user of the information processing apparatus 100 may interactively adjust the value by using the keyboard 1004 or mouse 1005. In equation (1), when Ct=0, w=1. When Ct=Dr, w=0. The weight w may be decided based on any function other than equation (1) if it gradually attenuates the value w. For example, $$w=(Dr-Ct)/Dr \qquad (2)$$

is also usable.

In step S6040, the position and orientation integration unit 450 updates the reference values of correction values by multiplying the current reference values of correction values by the weight w obtained in step S6030. The correction values are parameters that correct the position and orientation estimated values (position estimated value t1 and orientation estimated value R1) obtained in step S6010 to maintain the consistency between frames. Hence, in step S6040, a position correction value Δt and a rotation component Δθ of the orientation correction value are calculated By $$\Delta t = w \times tb \qquad (3)$$

$$\Delta\theta = w \times \theta b \qquad (4)$$

where tb is the reference value of the position correction value, and θb is the rotation angle of a reference value Rb of the orientation correction value. In step S6040, calculation is done by using Δθ obtained by equation (4) and a rotation axis $\omega b=[\xi b\ \psi b\ \zeta b]^T$ of the reference value Rb of the orientation correction value to obtain an orientation correction value ΔR given by $$\Delta R = R(\omega b, \Delta\theta) \qquad (5)$$

The weight w gradually attenuates as the time elapses. Hence, the position correction value gradually decreases toward 0 along with the lapse of time. Similarly, the orientation correction value gradually approaches a unit matrix along with the lapse of time.

If an index exists not on the preceding frame image but on the frame image of interest, or an index exists not on the frame image of interest but on the preceding frame image (DisappFlg+AppFlg≠0), the frame counter Ct is set to 0, and the process advances from step S6050 to step S6060. If no index has newly appeared or disappeared on the image upon switching from the preceding frame to the frame of interest, (DisappFlg+AppFlg=0), the process advances from step S6050 to step S6150.

In step S6060, the data input unit 410 refers to the value of DisappFlg. If DisappFlg=1, the process advances to step S6070. If DisappFlg=0, the process advances to step S6090.

In step S6070, the third position and orientation calculation unit 440 receives the set of the identifiers and image coordinates of common indices located on the preceding frame image from the data input unit 410. The third position and orientation calculation unit 440 acquires, from the external storage device 1007, the positions of the common indices located on the preceding frame image in the reference coordinate system by using the identifiers of the common indices located on the preceding frame image. The third position and orientation calculation unit 440 calculates the estimated values of the position and orientation of the image sensing device 150 by using the image coordinates of the common indices located on the preceding frame image received from the data input unit 410 and the positions of all indices located on the preceding frame image in the reference coordinate system. Let t3 be the calculated position estimated value, and R3 be the orientation estimated value. The position and orientation estimated values obtained in this step indicate the position and orientation of the image sensing device 150 when it is assumed that the index absent in the frame of interest has already disappeared in the preceding frame.

In step S6080, the position and orientation integration unit 450 calculates the variations of the position and orientation of the image sensing device 150 which are generated because an index has disappeared on the image upon switching from the preceding frame to the frame of interest. This calculation is done by using the position estimated value t3 and orientation estimated value R3 obtained in step S6070 and a position t0 and an orientation R0 which are finally obtained as the position and orientation of the image sensing device 150 in the preceding frame. A position variation Δtd and an orientation variation ΔRd are given by $$\Delta td = t0 - t3 \qquad (6)$$

$$\Delta Rd = R0 \times R3^{-1} \qquad (7)$$

The variations obtained in this step directly express the discontinuity of the position and orientation generated by disappearance of the index.

In step S6090, the data input unit 410 refers to the value of AppFlg. If AppFlg=1, the process advances to step S6100. If AppFlg=0, the process advances to step S6130.

In step S6100, the second position and orientation calculation unit 430 receives the set of the identifiers and image coordinates of common indices located on the frame image of interest from the data input unit 410. The second position and orientation calculation unit 430 acquires, from the external storage device 1007, the positions of the common indices located on the frame image of interest in the reference coordinate system by using the identifiers of the common indices located on the frame image of interest. The second position and orientation calculation unit 430 calculates the estimated values of the position and orientation of the image sensing device 150 by using the image coordinates of the common indices located on the frame image of interest received from the data input unit 410 and the positions of all indices located on the frame image of interest in the reference coordinate system. Let t2 be the calculated position estimated value, and R2 be the orientation estimated value.

In step S6110, the second position and orientation calculation unit 430 corrects the position estimated value t2 and orientation estimated value R2 obtained in step S6100 by using the correction values updated in step S6040. More specifically, the position estimated value t2 and orientation estimated value R2 are corrected to $$t2'=t2+\Delta t \quad (8)$$

$$R2'=\Delta R \times R2 \quad (9)$$

where t2' is the corrected position estimated value, and R2' is the corrected orientation estimated value.

In step S6120, the position and orientation integration unit 450 calculates the variations of the position and orientation of the image sensing device 150 which are generated because an index has appeared on the image upon switching from the preceding frame to the frame of interest. This calculation is done by using the position estimated value t1 and orientation estimated value R1 obtained in step S6010 and t2' and R2' obtained in step S6110. A position variation Δta and an orientation variation ΔRa are given by $$\Delta ta = t2' - t1 \quad (10)$$

$$\Delta Ra = R2' \times R1^{-1} \quad (11)$$

The variations obtained in this step directly express the discontinuity of the position and orientation of the image sensing device 150 generated by appearance of the index.

In step S6130, the position and orientation integration unit 450 obtains the reference values of correction values to be used to execute the process of these flowcharts for each frame from the frame of interest. More specifically, the position and orientation integration unit 450 obtains the reference values of correction values by calculating $$tb = \Delta Ra \times \Delta td + \Delta ta \quad (12)$$

$$Rb = \Delta Ra \times \Delta Rd \quad (13)$$

The reference values of correction values are used to avoid inconsistency between frames when an index has appeared or disappeared between them. The inconsistency between frames can be avoided by adding tb and Rb to t1 and R1 in the frame of interest. In subsequent frames, correction values obtained by multiplying the reference values by a weight that decreases along with the lapse of time are added. The state is made to gradually approach a state without correction (i.e., a state wherein optimum position and orientation are obtained in a frame) by attenuating the correction values.

In step S6140, the position and orientation integration unit 450 sets the reference values of correction values calculated in step S6130 as the correction values for the frame of interest, which are given by $$\Delta t = tb \quad (14)$$

$$\Delta \theta = \theta b \quad (15)$$

With the above-described process in steps S6060 to S6140, the reference values of correction values can be set to cope with the existence of disappearing and appearing indices between the preceding frame and the frame of interest.

In step S6150, the position and orientation integration unit 450 corrects the position estimated value t1 and orientation estimated value R1 obtained in step S6010 by using the correction values Δt and ΔR obtained in step S6040 or S6140, thereby obtaining a position t1' and an orientation R1' which should be obtained finally as the "position and orientation of the image sensing device 150 in the frame of interest". This process is done by calculating $$t1'=t1+\Delta t \quad (16)$$

$$R1'=\Delta R \times R1 \quad (17)$$

If the period without disappearance/appearance of indices continues Dr frames or more, Δt changes to 0, and ΔR changes to a unit matrix. Hence, t1 and R1 are directly used as t1' and R1'.

In step S6160, the position and orientation integration unit 450 outputs the position t1' and orientation R1' obtained in step S6150. The position and orientation may be output to either a device such as the external storage device 1007 inside the computer or an external device via the I/F 1009.

In this embodiment, the position of the image sensing device 150 is expressed by the ternary vector t1', and the orientation is expressed by the 3×3 rotation matrix R1'. However, the position and orientation expression method is not limited to this. For example, the orientation may be converted into, e.g., a rotation axis vector and a rotation angle, Euler angle, or quaternion. The position and orientation may be expressed by a 4×4 position and orientation transformation matrix by a homogeneous coordinate expression, or an inverse matrix thereof. The position and orientation of the reference coordinate system with respect to the image sensing device 150 may be obtained and output. The above-described expressions may be combined and output simultaneously.

Finally in step S6170, the position t1' and orientation R1' obtained in step S6150 are stored in the external storage device 1007 or RAM 1002 as t0 and R0 to execute the process of the flowcharts for each frame from the frame of interest.

As described above, according to this embodiment, the disappearance/appearance of indices between frames is monitored. It is therefore possible to avoid the inconsistency in position and orientation measurement of the image sensing device 150 caused by the disappearance/appearance of indices. As a result, the position and orientation of the image sensing device 150 can be measured while ensuring both the consistency between frames and following to movement.

In this embodiment, the image input unit 110, index detection unit 120, index selection unit 130, and position and orientation calculation unit 140 shown in FIG. 1 are implemented by software and installed in a single computer. However, some of them may be implemented by hardware. For example, the index detection unit 120 may be implemented by a graphic board.

In this embodiment, the image input unit 110, index detection unit 120, index selection unit 130, and position and orientation calculation unit 140 are installed in a single apparatus as software. However, the present invention is not limited to this. These units may divisionally be installed in two or more computers which cooperate with each other to implement the above-described process. At least one of the image input unit 110, index detection unit 120, index selection unit 130, and position and orientation calculation unit 140 may be implemented by hardware.

Second Embodiment

In this embodiment, the position of a measurement target object is measured by using a plurality of image sensing devices arranged in the physical space. FIG. 7 is a block diagram showing the functional arrangement of a system for measuring the position of a measurement target object by using a plurality of image sensing devices according to this embodiment. As shown in FIG. 7, the system according to this embodiment includes image sensing devices 750a to 750d and an information processing apparatus 700. The information processing apparatus 700 comprises an image input unit 710, index detection unit 720, index selection unit 730, and position calculation unit 740.

In this embodiment, a measurement target object 760 is used as an example. An index 770 is attached to the measurement target object 760. The information processing apparatus 700 measures the position of the index 770 as the position of the measurement target object 760.

Each of the image sensing devices 750a to 750d is a camera capable of sensing a moving image of the physical space, and for example, a digital video camera. Each frame image sensed by each of the image sensing devices 750a to 750d is input to the image input unit 710 of the information processing apparatus 700 as an image signal. The camera intrinsic parameters (e.g., focal distance and focus value) of the image sensing devices 750a to 750d and their positions and orientations in the reference coordinate system are known.

The image input unit 710 converts each received frame image signal into digital data and outputs it to the index detection unit 720 of the succeeding stage. That is, the image input unit 710 supplies the image data of each frame to the index detection unit 720. In this embodiment, the image sensing devices 750a to 750d connect to the image input unit 710 such that the image input unit 710 can identify them. For this purpose, any arrangement can be employed if the image input unit 710 that has received an image from one of the image sensing devices 750a to 750d can grasp the image sensing device of the output source. For example, each of the image sensing devices 750a to 750d may send identification information unique to it to the image input unit 710 together with a sensed frame image.

The index detection unit 720 detects the index 770 located in each frame image received from the image input unit 710. More specifically, the index detection unit 720 identifies the index 770 located in each image and detects its image coordinates. The index detection unit 720 outputs the image coordinates of the detected index 770 to the index selection unit 730.

If the index detection unit 720 cannot detect the index 770 from the image, the index selection unit 730 is notified of it. For example, assume that in the example shown in FIG. 7, the index detection unit 720 detects the index 770 from the images received from the image sensing devices 750a, 750c, and 750d but not from the image received the image sensing device 750b. In this case, the index detection unit 720 outputs the image coordinates of the index 770 in each of the images received from the image sensing devices 750a, 750c, and 750d and information representing that no index 770 is detected from the image received from the image sensing device 750b. To detect the index 770, any method is usable, as described in the first embodiment.

The index selection unit 730 receives a message representing that "no index 770 is detected" or the image coordinates of the index 770 from the index detection unit 720. The index selection unit 730 monitors disappearance/appearance of the index 770 between frames, selects information necessary for calculating the position of the measurement target object 760, and outputs the information to the position calculation unit 740.

The process executed by the index selection unit 730 will be described in more detail. First, the index selection unit 730 checks whether the index 770 is detected from both the preceding frame and the frame of interest received from each of the image sensing devices 750a to 750d. The index selection unit 730 creates a list of identification information unique to the image sensing devices on witch the detection of the index 770 has succeeded in both the preceding frame and the frame of interest. Hereinafter, a set of index 770 observed by the image sensing devices 750 in the list is referred to as common indices.

In the arrangement shown in FIG. 7, if the index 770 is detected from both the preceding frame and the frame of interest received from the image sensing device 750a, the index selection unit 730 holds identification information unique to the image sensing device 750a in the list. If the index 770 is detected from both the preceding frame and the frame of interest received from the image sensing device 750b, the index selection unit 730 holds identification information unique to the image sensing device 750b in the list. If the index 770 is detected from both the preceding frame and the frame of interest received from the image sensing device 750c, the index selection unit 730 holds identification information unique to the image sensing device 750c in the list. If the index 770 is detected from both the preceding frame and the frame of interest received from the image sensing device 750d, the index selection unit 730 holds identification information unique to the image sensing device 750d in the list.

If the index 770 is detected from the frame image of interest but not from the preceding frame image received from one of the image sensing devices 750a to 750d, the index selection unit 730 sets the value of flag AppFlag to 1. Otherwise, the index selection unit 730 sets the value of flag AppFlag to 0.

If the index 770 is detected from the preceding frame image but not from the frame image of interest received from one of the image sensing devices 750a to 750d, the index selection unit 730 sets the value of flag DisappFlg to 1. Otherwise, the index selection unit 730 sets the value of flag DisappFlag to 0.

Then, the index selection unit 730 outputs the following data to the position calculation unit 740 on the basis of the following conditions.

(1) The image coordinates of the index 770 located on the frame image of interest sensed by the image sensing devices 750a to 750d (2) The value of flag AppFlg (0 or 1)

(3) The value of flag DisappFlg (0 or 1)

(4) When AppFlg=1→the image coordinates of the common indices located on the frame image of interest received from each image sensing device in the list.

(5) When DisappFlg=1→the image coordinates of the common indices located on the preceding frame image received fromeach image sensing device in the list.

AppFlg is 1 when there is at least one image sensing device on which the index 770 is detected from the frame image of interest but not from the preceding frame image.

DisappFlg is 1 when there is at least one image sensing device on which the index 770 is detected from the preceding frame image but not from the frame image of interest.

The position calculation unit 740 calculates the position of the measurement target object 760 by using the image coordinates of the index received from the index selection unit 730.

In this embodiment, a computer having the arrangement shown in FIG. 5 is applied to the hardware configuration of the information processing apparatus 700, as in the first embodiment. Even in this embodiment, the image input unit 710, index detection unit 720, index selection unit 730, and position calculation unit 740 are implemented by software and installed in a single computer. However, some of them may be implemented by hardware. For example, the index detection unit 720 may be implemented by a graphic board.

The image input unit 710, index detection unit 720, index selection unit 730, and position calculation unit 740 may divisionally be installed in two or more computers which cooperate with each other to implement the position measurement process of the measurement target object 760. At least one of the image input unit 710, index detection unit 720, index selection unit 730, and position calculation unit 740 may be implemented by hardware.

Figure 10:
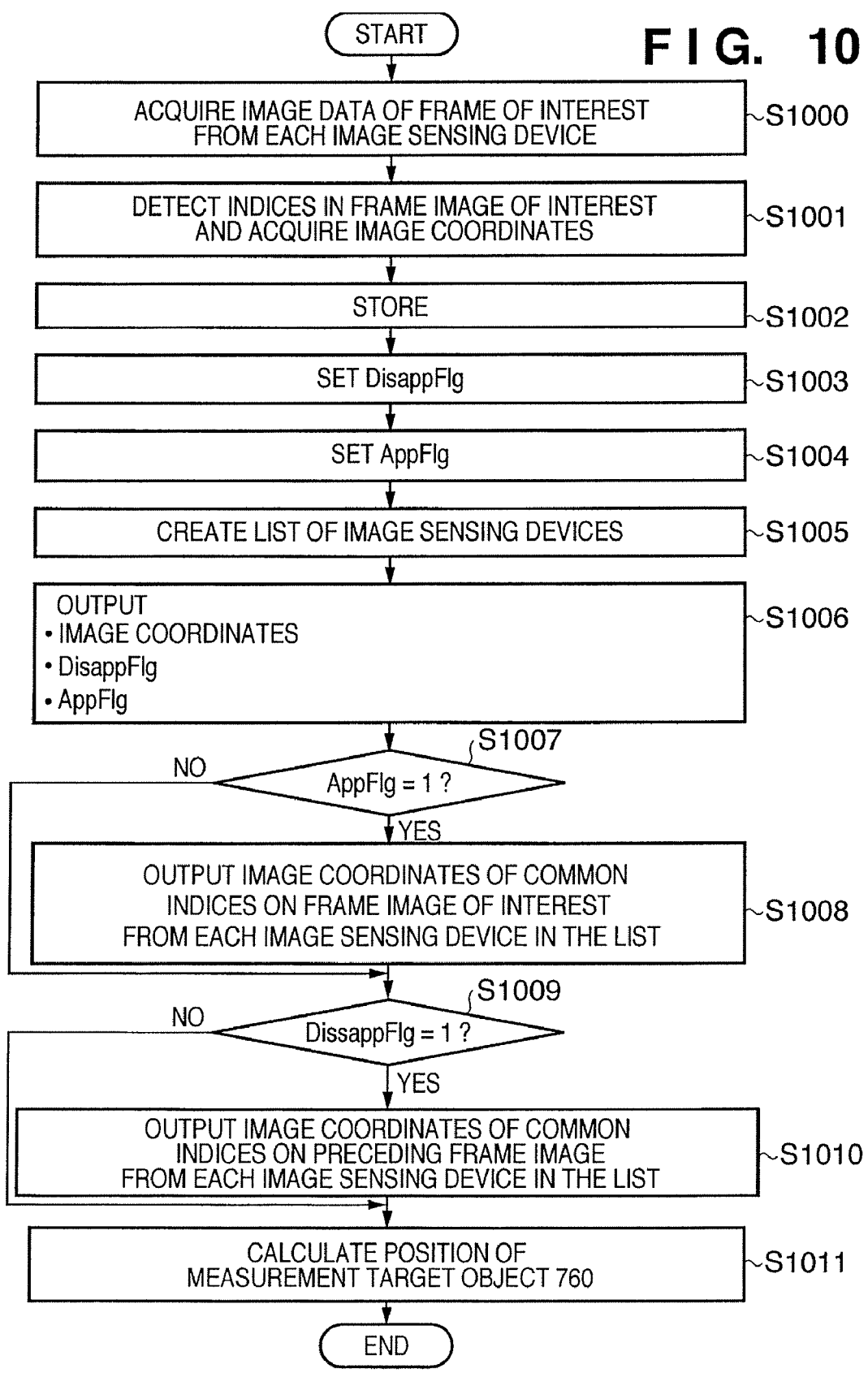
FIG. 10 is a flowchart of a process executed by an information processing apparatus 700 to obtain the position of a measurement target object 760 in a frame of interest.

FIG. 10 is a flowchart of a process executed by the information processing apparatus 700 to obtain the position of the measurement target object 760 in a frame of interest. To do the same process for each frame, the process corresponding to the flowchart in FIG. 10 is executed for each frame.

An external storage device 1007 saves the programs and data to cause a CPU 1001 to execute the process corresponding to the flowchart in FIG. 10. The programs and data are loaded to a RAM 1002 under the control of the CPU 1001. The CPU 1001 executes the process by using them, thereby implementing the processes to be described later.

In step S1000, the image input unit 710 supplies image data of the frame of interest sensed by each of the image sensing devices 750a to 750d to the index detection unit 720. In step S1001, the index detection unit 720 identifies the index 770 located in each frame image of interest and detects its image coordinates. The index detection unit 720 outputs the image coordinates of the detected index 770 to the index selection unit 730. If the index detection unit 720 cannot detect the index 770, the index selection unit 730 is notified of it.

In step S1002, upon receiving the image coordinates of the index located on the frame image of interest or a message representing that no index 770 is detected, the index selection unit 730 holds the data. In step S1003, the index selection unit 730 sets the flag DisappFlg. In step S1004, the index selection unit 730 sets the flag AppFlg.

The flag AppFlg is set to 1 when there is at least one image sensing deviceon which the index 770 is detected from the frame image of interest but not from the preceding frame image, as described above. AppFlg is initialized to 0 by default. DisappFlg is also set to 1 when there is at least one image sensing deviceon which the index 770 is detected from the preceding frame image but not from the frame image of interest, as described above. DisappFlg is initialized to 0 by default.

In step S1005, the index selection unit 730 creates and holds a list of identification information unique to the image sensing devices on witch the detection of the index 770 has succeeded in both the preceding frame and the frame of interest.

In step S1006, the index selection unit 730 outputs the image coordinates of the index 770 located on the frame image of interest from each of the image sensing devices 750a to 750d or information representing that no index is detected, and the flags AppFlg and DisappFlg to the position calculation unit 740.

In step S1007, the index selection unit 730 refers to the value of AppFlg. If AppFlg=1, the process advances to step S1008. In step S1008, the index selection unit 730 outputs, to the position calculation unit 740, the image coordinates of the common indices in the frame image of interest received from each image sensing device in the list.

In step S1009, the index selection unit 730 refers to the value of DisappFlg. If DisappFlg=1, the process advances to step S1010. In step S1010, the index selection unit 730 outputs, to the position calculation unit 740, the image coordinates of the common indices in the preceding frame image received from each image sensing device in the list.

In step S1011, the position calculation unit 740 obtains the position of the measurement target object 760 in the frame of interest.

Figure 8A:
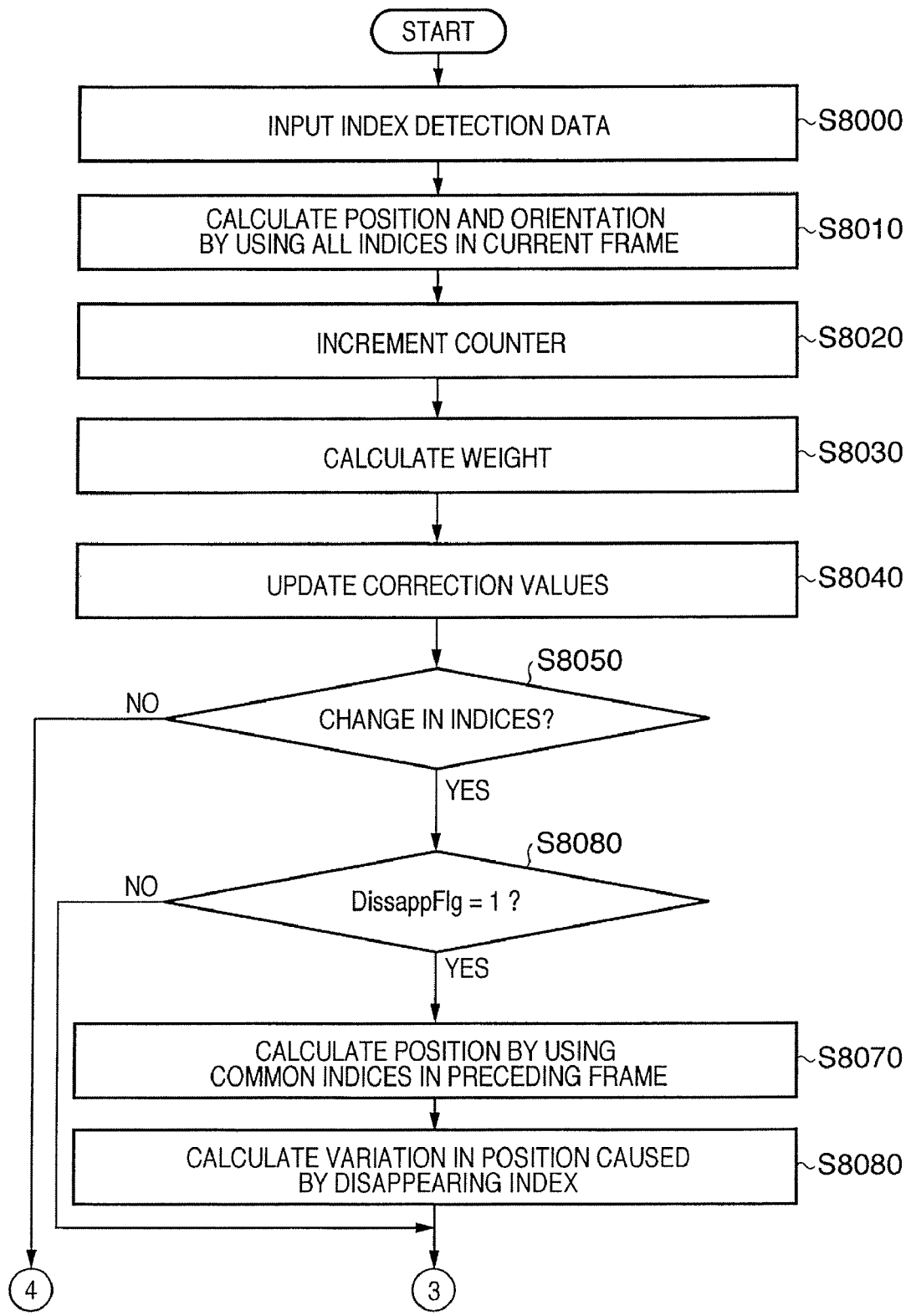
FIGS. 8A and 8B are flowcharts showing details of a process in step S1011.
Figure 8B:
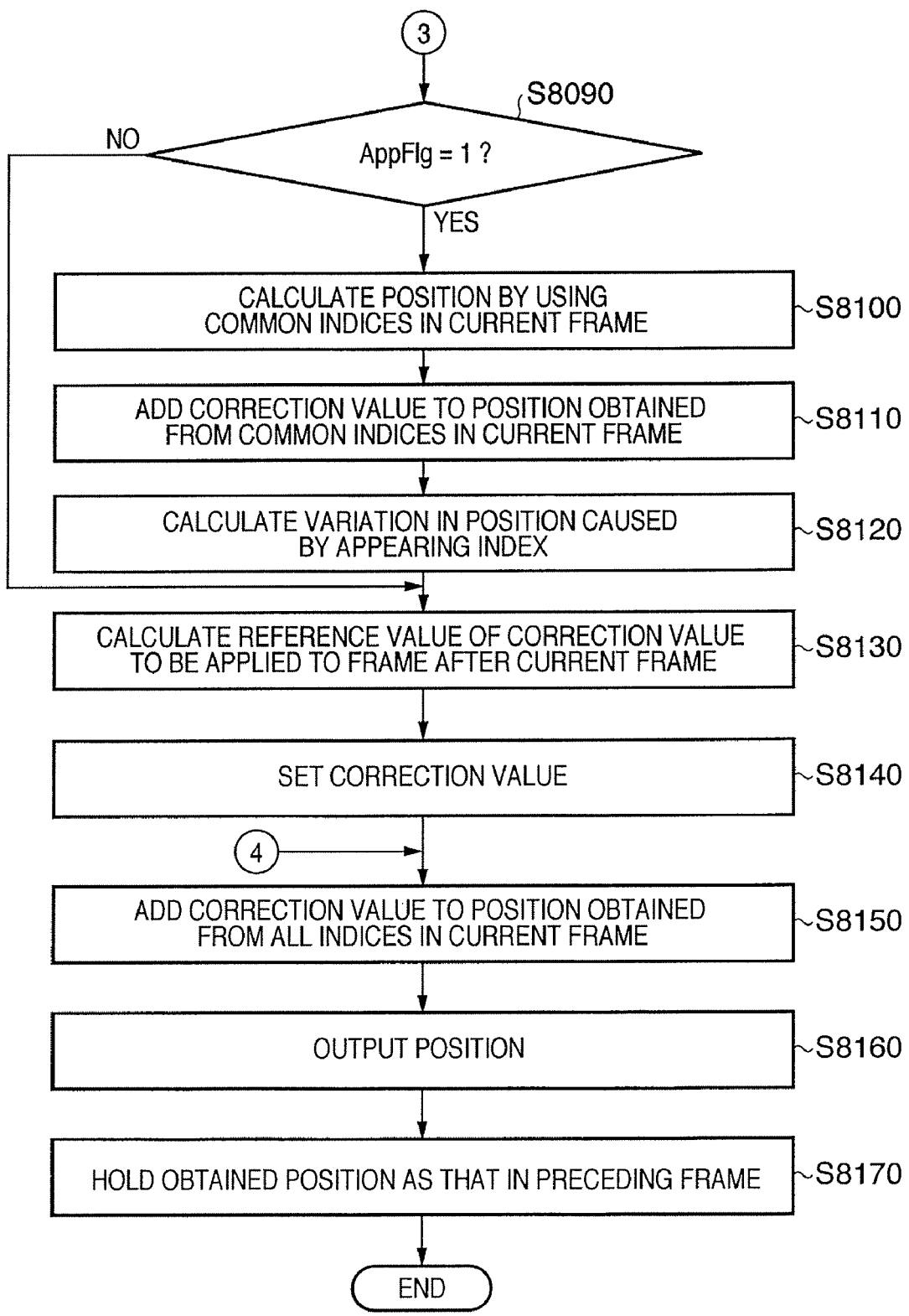

FIGS. 8A and 8B are flowcharts showing details of the process in step S1011. In the following description, the position of the measurement target object 760 is internally expressed by a ternary vector $t=[x\ y\ z]^T$.

In step S8000, the position calculation unit 740 receives image coordinate data (index detection data) of the index 770 on the frame of interest by at least two image sensing devices from the index selection unit 730. In step S8010, the estimated value of the position of the measurement target object 760 is calculated on the basis of the principle of triangulation by using the coordinate positions of the index 770 located on each frame image of interest. The calculation based on triangulation is done by using even the position and orientation of each image sensing device in the reference coordinate system.

Let t1 be the calculated position estimated value. More specifically, the estimated value t1 is decided by a least square method such that the sum of the reprojection errors of the index 770 on the frame images of interest is minimized.

In step S8020, a frame counter Ct (initial value=0) is incremented by one. In step S8030, a weight w to be multiplied by the reference value (to be described later) of a correction value is calculated on the basis of the value of the frame counter Ct. The process contents of steps S8020 and S8030 are the same as those of steps S6020 and S6030.

In step S8040, the reference value of the correction value is updated by multiplying the current reference value of the correction value by the weight w obtained in step S8030. This process is done by calculating equation (3).

If DisappFlg+AppFlg≠0, the frame counter Ct is set to 0, and the process advances from step S8050 to step S8060. If DisappFlg+AppFlg=0, the process advances from step S8050 to step S8150.

In step S8060, the value of DisappFlg is referred to. If DisappFlg=1, the process advances to step S8070. If DisappFlg=0, the process advances to step S8090.

In step S8070, the estimated value of the position of the measurement target object 760 is calculated on the basis of the principle of triangulation by using the image coordinates of the common indices located on the preceding frame image obtained from each image sensing device in the list. Let t3 be the calculated position estimated value.

In step S8080, a difference value Δtd between the position estimated value t3 obtained in step S8070 and the position t0 finally obtained as the position of the measurement target object 760 on the preceding frame is obtained in accordance with equation (6).

In step S8090, the value of AppFlg is referred to. If AppFlg=1, the process advances to step S8100. If AppFlg=0, the process advances to step S8130.

In step S8100, the estimated value of the position of the measurement target object 760 is calculated on the basis of the principle of triangulation by using the image coordinates of the common indices located on the frame image of interest obtained from each image sensing device in the list. Let t2 be the calculated position estimated value.

In step S8110, the position estimated value t2 obtained in step S8100 is corrected by using the correction value updated in step S8040. More specifically, a process corresponding to equation (8) is executed. Let t2' be the corrected position estimated value.

In step S8120, Δta is obtained by equation (10) using the position estimated value t1 obtained in step S8010 and t2' obtained in step S8110.

In step S8130, the reference value of the correction value to be used to execute the process of these flowcharts for each frame from the frame of interest is obtained. More specifically, the reference value of the correction value is obtained by calculating $$tb = \Delta td + \Delta ta \quad (18)$$

In step S8140, the reference value of the correction value calculated in step S8130 is set as the correction value for the frame of interest, like equation (14).

With the above-described process in steps S8060 to S8140, the reference value of the correction value can be set to cope with the existence of disappearing and appearing indices between the preceding frame and the frame of interest.

In step S8150, a position t1' which should be obtained finally as the "position of the measurement target object 760 in the frame of interest" is obtained by correcting the position estimated value t1 obtained in step S8010 by using the correction value Δt obtained in step S8040 or S8140. This process is done by calculating equation (16).

In step S8160, the position t1' obtained in step S8150 is output. The position may be output to either a device such as the external storage device 1007 inside the computer or an external device via an I/F 1009.

Finally in step S8170, the position t1' obtained in step S8150 is stored in the external storage device 1007 or RAM 1002 as t0 to execute the process of the flowcharts for each frame from the frame of interest.

As described above, according to this embodiment, the disappearance/appearance of the index between frames is monitored. It is therefore possible to avoid the inconsistency in position measurement of the measurement target object 760 caused by the disappearance/appearance of the index. As a result, the position of the measurement target object 760 can be measured while ensuring both the consistency between frames and following to movement.

Third Embodiment

<First Modification>

In the first embodiment, the position and orientation of an image sensing device are measured by using only images sensed by the image sensing device. In other words, a general position and orientation measurement method of measuring a position and orientation by using only images sensed by an image sensing device is improved to enable smooth and accurate measurement, thereby obtaining the position and orientation measurement method of the first embodiment. The same improvement is possible by combining the measurement method of the first embodiment with any method of obtaining a position and orientation by using indices.

<Second Modification>

Non-patent reference 1 above discloses a method of measuring the position and orientation of an object by using at least one user's view camera attached to the measurement target object and at least one bird's-eye view camera arranged on the ceiling or wall. In this method, an index in the environment is detected from an image captured by the user's view camera, whereas an index on the measurement target object is detected from an image captured by the bird's-eye view camera. The position and orientation of the measurement target object are calculated by using the information of all detected indices.

The method described in the first embodiment can easily be combined with such a method using a plurality of devices by changing some functions of an image input unit 110, index detection unit 120, index selection unit 130, and position and orientation calculation unit 140. In this case, the image input unit 110 receives an image from each camera. The index detection unit 120 detects indices from the input image from each camera and outputs identifiers and detected coordinates. The index selection unit 130 selects a common index between consecutive frames and determines the presence/absence of appearing and disappearing indices in the detection result of each camera. In the arrangement using the plurality of image sensing devices, AppFlg is set to 1 when at least one camera has detected a new index. Similarly, DisappFlg is set to 1 when at least one camera has lost the sight of an index that was detected in the preceding frame. The index selection unit 130 outputs the following data.

(A) The identifiers and image coordinates of all detected indices of all cameras in the input frame image of interest (output independently of disappearance/appearance of indices)

(B) Flag AppFlg (0 or 1)

(C) The identifiers and image coordinates of common indices of all cameras in the input frame image of interest (output only when an appearing index exists)

(D) Flag DisappFlg (0 or 1)

(E) The identifiers and image coordinates of common indices of all cameras in the input preceding frame image (output only when a disappearing index exists)

The operation of the position and orientation calculation unit 140 is the same as in the first embodiment except that position and orientation calculation units 420, 430, and 440 use information from the plurality of cameras. The method of obtaining the position and orientation of the measurement target object by using information from the plurality of cameras is disclosed in non-patent reference 1, and a detailed description thereof will be omitted.

Even to obtain the position and orientation of an object with a plurality of indices by using at least one bird's-eye view camera, the effect of the present invention is available by the same improvement. In this case, the user's view camera is removed from the above-described modification.

<Third Modification>

On the other hand, the position and orientation of the image sensing device 150 are obtained by attaching an orientation sensor to it and using the orientation measurement value and indices. For example, non-patent reference 1 discloses a method directly using an orientation measured by an orientation sensor as the orientation of the image sensing device 150. In this method, only the position of the image sensing device 150 is an unknown parameter. The unknown parameter is calculated by using the detection coordinates of indices. Non-patent reference 1 also discloses a method of defining the position and azimuth of the image sensing device 150 as unknown parameters and calculating them by using the detection coordinates of indices.

The method described in the first embodiment can easily be combined with such a method using another measurement means by changing some functions of the position and orientation calculation unit 140. In this case, a data input unit 410 also receives the orientation measurement value from the orientation sensor. The first position and orientation calculation unit 420 estimates the position (and azimuth) of the image sensing device 150 on the basis of the orientation measurement value in the current frame and information of all detected indices in the current frame. The second position and orientation calculation unit 430 estimates the position (and azimuth) of the image sensing device 150 on the basis of the orientation measurement value in the current frame and information of common indices in the current frame. The third position and orientation calculation unit 440 estimates the position (and azimuth) of the image sensing device 150 on the basis of the orientation measurement value in the preceding frame and information of common indices in the preceding frame.

A position and orientation integration unit 450 calculates the position (and azimuth) of the image sensing device 150 in the current frame on the basis of the position (and azimuth) obtained by each position and orientation calculation unit. The position integration process is equivalent to a process considering the correction value of only the position in the flowcharts of the first embodiment. The azimuth integration process is executed in the same way as the position integration process. The discontinuity in index appearance and that in index disappearance are obtained. The sum of these values is obtained as the reference value of the azimuth correction value and used.

As described above, the gist of the present invention is that the disappearance/appearance of indices between frames is monitored, the inconsistency caused by the disappearance/appearance of indices is detected by using the position and orientation (or a similar parameter such as an azimuth) obtained by using common indices, and correction is done to solve the inconsistency. The effect of the present invention can be obtained independently of the number or types (bird's-eye view and user's view) of cameras to monitor indices, the index type and detection method, the presence/absence of additional information of a sensor or the like, and the position and orientation calculation method.

<Fourth Modification>

In the above-described embodiments, all indices detected on the preceding frame are compared with all indices detected on the frame of interest. However, the index comparison method is to limited to this. For example, the method proposed in the above-described embodiment can be combined with a position and orientation calculation method that removes information of an erroneously detected or erroneously identified index (outlier). In this case, the index determined as an outlier in the process of each frame is not used as the comparison target.

If the number of detected indices is enormous, the position and orientation may be estimated by using only several indices to reduce the calculation amount. the method proposed in the above-described embodiment can be combined with such a method. In this case, only indices actually used for position and orientation estimation are used as the comparison target between frames.

<Fifth Modification>

In the above-described embodiments, the reference values of correction values are obtained by adding a weight to the variation of the position and orientation generated by a disappearing index and the variation of the position and orientation generated by an appearing index. However, a calculation method of the reference value of the correction value is not limited to this. The reference value of the correction value may be obtained by using only one of the variation of the position and orientation generated by a disappearing index and the variation of the position and orientation generated by an appearing index. For example, if disappearance and appearance of indices have occurred between frames simultaneously, $$tb = \Delta td \tag{19}$$

$$Rb = \Delta Rd \tag{20}$$

may be used to obtain the reference values of correction values to be used to avoid the inconsistency between the frame of interest and the preceding frame in place of equation (12) (or (18)) and equation (13).

<Sixth Modification>

In the above-described embodiments, a value obtained by multiplying the reference values of correction values used to avoid the inconsistency between the frame of interest and the preceding frame by a weight that decreases along with the lapse of time is used to avoid the inconsistency between the frame of interest and the succeeding frame. However, the present invention is not limited to this. Different reference values of correction values may be used to avoid the inconsistency between the frame of interest and the preceding frame and that between the frame of interest and the succeeding frame. For example, if disappearance and appearance of indices have occurred between frames simultaneously, $$tb' = \Delta ta \tag{21}$$

$$Rb' = \Delta Ra \tag{22}$$

may be used to obtain the reference values of correction values to be used to avoid the inconsistency between the frame of interest and the succeeding frame in place of equation (12) (or (18)) and equation (13).

Other Embodiment

The object of the present invention is also achieved by the following method. A recording medium (or storage medium) which records software program codes to implement the functions of the above-described embodiments is supplied to a system or apparatus. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

When the computer executes the readout program codes, the operating system (OS) running on the computer partially or wholly executes actual processing on the basis of the instructions of the program codes, thereby implementing the functions of the above-described embodiments.

The program codes read out from the recording medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100388 filed Mar. 31, 2006, which is hereby incorporated by reference herein in its entirety.

What is claimed is:

1. A position and orientation of an image sensing device measurement method using an information processing apparatus, comprising:

an image input step of inputting an image from the image sensing device;

an index detection step of detecting indices sensed in the image and acquiring information about image coordinates of the indices;

a position and orientation calculation step of calculating a position and orientation of the image sensing device by using information about image coordinates of current indices detected from a current frame in the index detection step;

a correction value calculation step of determining index appearance and/or disappearance between the current indices and past indices used to calculate the position and orientation of the image sensing device in a past frame and calculating position and orientation correction values of the image sensing device to relax discontinuity in position and orientation estimated values between frames caused by the index appearance and/or disappearance; and a position and orientation correction step of correcting the position and orientation of the image sensing device calculated in the position and orientation calculation step by using the correction values calculated in the correction value calculation step.

2. The method according to claim 1, wherein in the correction value calculation step, if no index appearance/disappearance is detected, a value obtained by multiplying a correction value calculated upon detecting the index appearance/disappearance by a weight that attenuates along with a lapse of time from a point of time is used as the correction value in the current frame.

3. A non-transitory computer-readable recording medium which stores a control program which causes a computer to execute the position and orientation of the image sensing device measurement method, comprising the steps of:

an image input step of inputting an image from the image sensing device;

an index detection step of detecting indices sensed in the image and acquiring information about image coordinates of the indices;

a position and orientation calculation step of calculating a position and orientation of the image sensing device by using information about image coordinates of current indices detected from a current frame in the index detection step;

a correction value calculation step of determining index appearance and/or disappearance between the current indices and past indices used to calculate the position and orientation of the image sensing device in a past frame and calculating position and orientation correction values of the image sensing device to relax discontinuity in position and orientation estimated values between frames caused by the index appearance and/or disappearance; and a position and orientation correction step of correcting the position and orientation of the image sensing device calculated in the position and orientation calculation step by using the correction values calculated in the correction value calculation step.

4. A position and orientation of an image sensing device measurement method using an information processing apparatus comprising:

an image input step of inputting an image from the image sensing device;

an index detection step of detecting indices sensed in the image and acquiring information about image coordinates of the indices;

an index selection step of comparing current indices detected from a current frame in the index detection step with past indices used to calculate the position and orientation of the image sensing device in a past frame and selecting common indices commonly included in both the current indices and the past indices;

a first position and orientation calculation step of calculating a first position and orientation of the image sensing device by using the information about the image coordinates of the current indices;

a second position and orientation calculation step of calculating a second position and orientation of the image sensing device by using information about image coordinates of only indices selected as the common indices from the current indices; and a position and orientation integration step of calculating the position and orientation of the image sensing device in the current frame by using the first position and orientation and the second position and orientation.

5. The method according to claim 4, wherein in the position and orientation integration step, a variation between the first position and orientation and the second position and orientation is obtained, and the obtained variation is added to the first position and orientation, thereby calculating the position and orientation of the image sensing device.

6. A position and orientation of an image sensing device measurement method using an information processing apparatus comprising:

an image input step of inputting an image from the image sensing device;

an index detection step of detecting indices sensed in the image and acquiring information about image coordinates of the indices;

an index selection step of comparing current indices detected from a current frame in the index detection step with past indices used to calculate the position and orientation of the image sensing device in a past frame and selecting common indices commonly included in both the current indices and the past indices;

a first position and orientation calculation step of calculating a first position and orientation of the image sensing device by using the information about the image coordinates of the current indices;

a second position and orientation calculation step of calculating a second position and orientation of the image sensing device by using information about image coordinates of only indices selected as the common indices from the past indices; and a position and orientation integration step of calculating the position and orientation of the image sensing device in the current frame by using the first position and orientation and the second position and orientation.

7. The method according to claim 6, wherein in the position and orientation integration step, a variation between the second position and orientation and a position and orientation applied in the past frame is obtained, and the obtained variation is added to the first position and orientation, thereby calculating the position and orientation of the image sensing device.

8. A position and orientation of an image sensing device measurement method using an information processing apparatus comprising:

an image input step of inputting an image from the image sensing device;

an index detection step of detecting indices sensed in the image and acquiring information about image coordinates of the indices;

an index selection step of comparing current indices detected from a current frame in the index detection step with past indices used to calculate the position and orientation of the image sensing device in a past frame and selecting common indices commonly included in both the current indices and the past indices;

a first position and orientation calculation step of calculating a first position and orientation of the image sensing device by using the information about the image coordinates of the current indices;

a second position and orientation calculation step of calculating a second position and orientation of the image sensing device by using information about image coordinates of only indices selected as the common indices from the current indices;

a third position and orientation calculation step of calculating a third position and orientation of the image sensing device by using information about image coordinates of only indices selected as the common indices from the past indices; and a position and orientation integration step of calculating the position and orientation of the image sensing device in the current frame by using the first position and orientation, the second position and orientation, and the third position and orientation.

9. The method according to claim 8, wherein in the position and orientation integration step, a variation between the first position and orientation and the second position and orientation and a variation between the third position and orientation and a position and orientation applied in the past frame are obtained, and the obtained variations are weighted and then added to the first position and orientation, thereby calculating the position and orientation of the image sensing device.

10. A position and orientation of a measurement target measurement method using an information processing apparatus comprising:

an image input step of inputting an image from at least one image sensing device that senses the measurement target;

an index detection step of detecting indices existing on the measurement target from the image and acquiring information about image coordinates of the indices;

a position and orientation calculation step of calculating a position or a position and orientation of the measurement target by using information about image coordinates of current indices detected from a current frame in the index detection step;

a correction value calculation step of determining index appearance and/or disappearance between the current indices and past indices used to calculate the position or the position and orientation of the measurement target in a past frame and calculating a position correction value or position and orientation correction values to relax discontinuity in a portion estimated value or position and orientation estimated values between frames caused by the index appearance and/or disappearance; and a position and orientation correction step of correcting the position or the position and orientation calculated in the position and orientation calculation step by using the correction values calculated in the correction value calculation step.

11. A position and orientation of an image sensing device measurement apparatus comprising:

image input unit adapted to input an image from the image sensing device;

index detection unit adapted to detect indices sensed in the image and acquire information about image coordinates of the indices;

position and orientation calculation unit adapted to calculate a position and orientation of the image sensing device by using information about image coordinates of current indices detected from a current frame by said index detection unit;

correction value calculation unit adapted to determine index appearance and/or disappearance between the current indices and past indices used to calculate the position and orientation of the image sensing device in a past frame and calculate position and orientation correction values of the image sensing device to relax discontinuity in position and orientation estimated values between frames caused by the index appearance and/or disappearance; and position and orientation correction unit adapted to correct the position and orientation of the image sensing device calculated by said position and orientation calculation unit by using the correction values calculated by said correction value calculation unit.

12. A position and orientation of a measurement target measurement apparatus comprising:

at least one image sensing device adapted to sense the measurement target;

image input unit adapted to input an image from said image sensing device;

index detection unit adapted to detect indices existing on the measurement target from the image and acquire information about image coordinates of the indices;

position and orientation calculation unit adapted to calculate a position or a position and orientation of the measurement target by using information about image coordinates of current indices detected from a current frame by said index detection unit;

correction value calculation unit adapted to determine index appearance and/or disappearance between the current indices and past indices used to calculate the position or the position and orientation of the measurement target in a past frame and calculate a position correction value or position and orientation correction values to relax discontinuity in a portion estimated value or position and orientation estimated values between frames caused by the index appearance and/or disappearance; and position and orientation correction unit adapted to correct the position or the position and orientation calculated by said position and orientation calculation unit by using the correction values calculated by said correction value calculation unit.

* * * * *